United States Patent [19]
Shiau

[11] Patent Number: 5,960,109
[45] Date of Patent: Sep. 28, 1999

[54] SINGLE PASS MARKER ENCLOSED AREA DETECTION SYSTEM AND METHOD FOR A PHOTOCOPIER

[75] Inventor: Jeng-Nan Shiau, Webster, N.Y.

[73] Assignee: Xerox Corporation, Stamford, Conn.

[21] Appl. No.: 08/117,591

[22] Filed: Sep. 7, 1993

[51] Int. Cl.[6] ............................................. G06K 9/46
[52] U.S. Cl. .............................. 382/164; 382/258
[58] Field of Search ........................ 382/26, 27, 55, 382/204, 205, 258, 164; 358/501, 505

[56] References Cited

U.S. PATENT DOCUMENTS

| | | | |
|---|---|---|---|
| 4,538,182 | 8/1985 | Saito et al. | 358/280 |
| 4,574,357 | 3/1986 | Pastor et al. | 382/55 |
| 4,777,651 | 10/1988 | McCann et al. | 382/21 |
| 4,901,100 | 2/1990 | DiBianca | 355/328 |
| 4,987,497 | 1/1991 | Yoshimura | 358/452 |
| 5,016,096 | 5/1991 | Matsunawa et al. | 358/75 |
| 5,041,919 | 8/1991 | Yamamoto et al. | 358/449 |
| 5,050,229 | 9/1991 | Barski et al. | 382/55 |
| 5,089,847 | 2/1992 | Folkins | 355/202 |
| 5,105,266 | 4/1992 | Telle | 358/80 |
| 5,136,399 | 8/1992 | Aoyama | 358/296 |
| 5,140,440 | 8/1992 | Sasaki | 358/453 |
| 5,142,355 | 8/1992 | Fujima | 358/75 |
| 5,146,511 | 9/1992 | Shirasaki | 382/55 |
| 5,148,500 | 9/1992 | Belanger | 382/55 |
| 5,216,498 | 6/1993 | Matsunawa et al. | 358/75 |
| 5,261,012 | 11/1993 | Hardy et al. | 382/55 |

FOREIGN PATENT DOCUMENTS

| | | |
|---|---|---|
| 0206853 | 12/1986 | European Pat. Off. . |
| 0357407 | 3/1990 | European Pat. Off. . |
| 0428795 | 5/1991 | European Pat. Off. . |
| 0441575 | 8/1991 | European Pat. Off. . |
| 2505518 | 11/1982 | France . |

OTHER PUBLICATIONS

Foley et al, "Computer Graphics: Principles and Practice" 2nd edition, 1991 Addsion–W wsley, pp. 33–37.

*Primary Examiner*—Amelia Au
*Assistant Examiner*—Larry J. Prikockis
*Attorney, Agent, or Firm*—Michael J. Nickerson

[57] ABSTRACT

The present invention provides a marker detection and thinning process for a photocopier which is executed during a single scan of a document and does not require a prescan of the document. The system realtime analyzes pixel image data, which is stored in a memory during the scanning process, to detect a marker line of a predetermined color and to thin the marker line. This analysis begins with image data stored in the memory that corresponds to a first pixel. The first pixel is associated with the scanline being presently scanned. It is determined if the image data of the first pixel represents a color that is equivalent to the predetermined color. Marker data is then stored in a buffer at a location corresponding to the first pixel if it is determined that the image data of the first pixel represents a color that is equivalent to a predetermined marker color. The data, stored in the buffer at a second pixel location, is analyzed. The second pixel is associated with a scanline that is prior in time to the scanline of the first pixel. It is determined if the data at the second pixel location is marker data. Also, the data stored in pixel locations adjacent to the second pixel location is analyzed to determine if this data is marker data. The marker data at the second pixel location is eliminated if it is determined, upon examining data of pixel locations adjacent to the second pixel location, that the elimination of this marker data would maintain the connectivity of the marker line. However, the data at the second pixel location is maintained if it is determined that, upon examining the data of pixel locations adjacent to the second pixel location, the elimination of this marker data would cause disconnectivity of the marker line.

40 Claims, 20 Drawing Sheets

SINGLE PASS MARKER ENCLOSED AREA DETECTION SYSTEM AND METHOD FOR A PHOTOCOPIER

FIELD OF THE PRESENT INVENTION

The present invention is directed to a marker editing system for a photocopier. More specifically, the present invention is directed to a marker editing system which provides marker editing while using only a single pass in the image scanning process of a document.

BACKGROUND OF THE PRESENT INVENTION

Conventional photocopiers have utilized a variety of marker editing features. These marker editing features allow a user to specify an area of the document with a color marker for special processing. In these systems, the photocopier detects an area enclosed by a marker and applies image processing steps to the pixels within the enclosed area specified by the user. These image processing steps could be, for example, deleting the image inside the color marker, changing the color of the image inside the color marker, highlighting the area inside the color marker, inserting graphical material or text within the color marker, or utilizing different image recognition processes upon the text within the color markers, using the color marker as a boundary for the processes. Although the conventional devices utilize a marker editing feature, most conventional devices require a prescanning of the document to detect the enclosed area or color marker.

Marker editing can be accomplished in several steps. First, the color markers from the document are detected by analyzing pixels which represent the scanned image. In other words, the pixels representing a color marker are determined. Each non-marker pixel is then classified as either belonging to an interior or an exterior of the marker curve. For the interior pixels, the image can remain unchanged, or user specified color conversion or other image processing steps can be performed thereon. For the exterior pixels, the image can remain unchanged, or user specified color conversion or other image processing steps can be performed thereon.

For the marker pixel itself, the image data associated with the marker pixel is replaced by a predetermined background value to erase the color marker from the output image.

To detect the color marker pixels, for example, the RGB values of each pixel of the document being scanned can be analyzed directly. However, a preferred approach is to convert RGB image data into hue, chroma (saturation) and lightness (intensity) (L*C*h) data. By comparing the chroma value of a pixel against a minimum chroma value to determine that the pixel is a color pixel and the hue angle of the pixel against a window surrounding a known marker hue value hm, the color marker pixels can be readily identified.

FIG. 1 illustrates a polar coordinate diagram showing the boundary parameters of a possible target color. More specifically, if the chroma and hue values of the pixel fall within the shaded area of the polar coordinate diagram, the pixel is determined to be a marker pixel. If the chroma and hue values of the pixel fall outside the shaded area of FIG. 1, the pixel is determined to be a non-marker pixel.

It is noted that the hue window limits are $h_{min}=h_m-dh$ and $h_{max}=h_m+dh$ wherein dh is a half window. It is noted that the known hue marker value $h_m$ is the center value of the hue window such that the hue window is created by adding a half window $d_h$ to either side of the center hue value $h_m$. Hue windows are defined in the range from 0° to 360°. Moreover, the hue value of the pixel is normalized prior to this analysis such that if the hue value of the pixel is less than 0°, the normalized hue value of the pixel becomes equal to $h_m+360°$, and if the hue value of the pixel is greater than or equal to 360°, the normalized hue value of the pixel becomes equal to $h_m-360°$. This normalization process is repeated until the normalized hue value of the pixel is within the range of 0° to 360°.

FIG. 2 illustrates a method for the detection of a color marker. At step S1, the chroma value of the pixel is compared with the minimum chroma value $C^*_{min}$ to determine if the chroma value is greater than the minimum chroma value $C^*_{min}$. If the chroma value of the pixel is not greater than the minimum chroma value $C^*_{min}$, the method determines that the pixel does not represent a color marker. However, if step S1 determines that the chroma value for the pixel is greater than the minimum chroma value $C^*_{min}$, step S2 determines whether $h_{max}$ is greater than $h_{min}$ for the hue window of the color marker.

Step S2 takes into account a case where the hue window straddles the 0° line. In other words, if $h_{min}$ is greater than $h_{max}$, the hue window is straddling the 0° line. If step S2 determines that the hue window is straddling the 0° line, step S4 further analyzes the hue value for the pixel to determine whether the pixel is a marker pixel. Step S4 determines whether the hue value for the pixel is less than $h_{max}$ or the hue value for the pixel is greater than $h_{min}$. If step S4 makes a positive determination, the pixel is determined to be a marker pixel. However, if step S4 makes a negative determination, the pixel is determined to be a non-marker pixel, not a color marker.

If the hue window does not straddle the 0° line, step S3 makes a determination of whether the hue value of the pixel is within the hue window. More specifically, step S3 determines whether the hue value of the pixel is greater than $h_{min}$ and less than $h_{max}$. If step S3 makes a positive determination, the pixel is determined to be a color marker pixel. However, if step S3 makes a negative determination, the pixel is determined to be a non-marker pixel, not a color marker pixel.

Since several markers of distinct colors can be used to mark a document, the hue of each pixel has to be checked against each marker's hue window. The result of this analysis and classification for the "j" pixel and the "i" scanline are stored in an integer array with the value set to zero for a non-marker pixel and 1 to "n" for a pixel representing one of the "n" marker colors. Once the marker pixels are identified, the pixels that are inside the marker or markers need to be identified. Techniques such as region growing and crossing counts can be used to determine which pixels are inside the marker or markers.

Region growing determines which region a pixel belongs by examining its immediate neighbors in the current and previous scanline. Region growing can be utilized to analyze a convex shaped enclosed area. This process can also work for a general shape in a two pass marker editing system with the sorting and merging of different regions being done between the two passes.

The border crossing count technique is also well known in computer graphics for raster scan conversion of a filled polygon. A horizontal line is drawn to the left from the pixel and the number of crossings along the line with the polygon edges are counted, excluding the crossings of a horizontal edge or a vertex that is a local minimum or maximum in the vertical coordinate. If the number of crossings is odd, the pixel is determined to be inside the enclosed marker area. On the other hand, if the number of crossings is even, the pixel is determined to be outside of the enclosed marker area.

One problem with utilizing this approach is that a typical marker trace is considerably wider than a pixel and a fairly large window is needed to discern the up and down characteristics of the marker border. A typical marker could be as large as 1mm thick. This would correspond to 16 pixels at a resolution of 400 spi (spots per inch). In order to effectively utilize a cross counting approach, a thinning step of the marker trace is required. Conventional methods for thinning use repeated applications of a logic operation upon a stored bit map to obtain the skeleton of the marker trace. This technique requires the prescanning of the document in conventional copiers.

Various aspects of marker editing systems are discussed briefly below.

U.S. Pat. No. 5,041,919 to Yamamoto et al., issued Aug. 20, 1991, discloses an image processing apparatus which utilizes a marker editing system to identify the area on a document for separate image processing. In this device, Yamamoto et al. disclose that two separate scannings of the document are required to identify the area outlined by the marker.

U.S. Pat. No. 5,142,355 to Fujima, issued Aug. 25, 1992, discloses a marker editing system for use in an image processing apparatus. More specifically, Fujima discloses that prior to the main scanning of the document, a marker scan or a closed area scan is performed. This way, marker image or closed frame image data can be preliminarily stored in a plane memory prior to the copying or image processing of a main scanning operation.

U.S. Pat. No. 5,140,440 to Sasaki, issued Aug. 18, 1992, discloses a method for detecting an enclosed area on a document for an image forming apparatus. This device requires two separate scannings to determine the image data in the marked area. More specifically, Sasaki discloses the utilization of two separate documents to enable the marker editing function. In this device, a first document containing the image information representative of the image printed on the document is scanned by the device. Then, a second document having positional information representative of the marked area of the image to be processed is scanned by the image forming apparatus. Upon scanning the two separate documents having different types of data, Sasaki discloses that the area for specific image processing can be detected and processed.

U.S. Pat. No. 5,136,399 to Aoyama, issued Aug. 4, 1992, discloses an image forming apparatus having a marker editing function using only a single scan. In this device, Aoyama discloses that the image is initially scanned by a copier to place the image digitally into a memory. The scanned image is then displayed on a screen for editing by the operator. According to Aoyama, the operator can utilize a light pen to mark the areas on the screen which require separate or special image processing. In this apparatus, the marker data is not inputted through the scanning of the original document.

U.S. Pat. No. 4,987,497 to Yoshimura, issued Jan. 22, 1991, discloses another image editing method for a digital copier wherein the marker for the document can be detected utilizing a single scan of the copier. More specifically, Yoshimura discloses a marker editing system which utilizes an inside erase mode and a paint-out erase mode. To distinguish between the two modes, Yoshimura discloses that the actual thickness of the marker scanned in by the digital copier is analyzed wherein a thicker marker represents the paint-out erase mode, while a thinner marker represents an inside erase mode.

U.S. Pat. No. 5,216,498 to Matsunawa et al., issued Jun. 1, 1993, discloses another image processing apparatus capable of detecting marked regions. Matsunawa et al. disclose an editing system capable of detecting marked regions utilizing a single scan of the marked document on the basis of the color data formed by a color data-forming circuit such that the region enclosed by the marker is extracted.

There is a need to provide a marker editing process which is capable of being implemented during the single pass of the document. More specifically, the marker editing process needs to be carried out, in realtime, during the actual photocopying process. The two scanning requirement to implement a marker editing function retards any increase or improvements realized in speed realized by other components in a copier system. Therefore, it is desirable that the marker editing function be carried out during the single pass of the document to enable a true increase in the processing speed of the photocopier system. Also, there is a need to provide a marker editing process which is capable of being implemented during the single pass of the document that does not place additional burdens upon the operator to be overly precise when marking a region. In other words, the marker editing system must be able to overcome common deficiencies in the operator's marking process, while maintaining the necessary speed to enable processing of the information during the real scan time of a document.

OBJECTS AND SUMMARY OF THE PRESENT INVENTION

It is an object of the present invention, therefore, to provide a system and method that enables the implementation of a marker editing function during the actual scanning of the document.

It is another object of the present invention to provide a specific thinning process which simplifies the marking editing function.

It is a further object of the present invention to provide a crossover detection function which analyzes the thinned marker to determine the area enclosed by the marker in a more accurate fashion.

One aspect of the present invention is a method for realtime analyzing pixel image data stored in a memory to detect a marker line of a predetermined marker color and to thin the marker line. The method analyzes image data stored in the memory corresponding to a first pixel, the first pixel being on a scanline being presently scanned, to determine if the image data of the first pixel represents a color that is equivalent to the predetermined marker color. Marker data is stored in a buffer at a first pixel location if it is determined that the image data of the first pixel represents a color that is equivalent to the predetermined marker color. Data stored in the buffer at a second pixel location is then analyzed, the second pixel being associated with a scanline prior in time to the scanline of the first pixel, to determine if the data at the second pixel location is marker data. Data stored in pixel locations adjacent to the second pixel location are also analyzed. The marker data at the second pixel location is eliminated if it is determined, upon examining data of pixel locations adjacent to the second pixel location, that the elimination of the marker data at the second pixel location would maintain the connectivity of the marker line.

Another aspect of the present invention is a system for realtime analyzing pixel image data stored in a memory to detect a marker line of a predetermined marker color and to thin the marker line. The system includes a first analyzer for analyzing image data stored in the memory corresponding to a first pixel, the first pixel being on a scanline being presently scanned, to determine if the image data of the first pixel represents a color that is equivalent to the predetermined marker color. A buffer is used to store marker data at a first pixel location if the first analyzer determines that the image data of the first pixel represents a color that is equivalent to the predetermined marker color. A second analyzer analyzes data stored in the buffer at a second pixel location, the second pixel being associated with a scanline prior in time to the scanline of the first pixel, to determine if the data at the second pixel location is marker data. Lastly, a circuit eliminates the marker data at the second pixel location if the second analyzer determines, upon examining data of pixel locations adjacent to the second pixel location, that the elimination of the marker data at the second pixel location would maintain the connectivity of the marker line.

A third aspect of the present invention is a method for realtime analyzing pixel image data to detect a marker line of a predetermined marker color and to thin the marker line. The method scans an area on the document representing a first pixel on a first scanline and stores image data corresponding to the scanned first pixel in a memory. The image data stored in the memory corresponding to a second pixel, during the scanning of the first pixel, is analyzed. The second pixel is on the first scanline. Marker data is stored in a buffer at the second pixel location if it is determined that the image data of the second pixel represents a color that is equivalent to the predetermined marker color. Data stored in the buffer at a third pixel location is then analyzed. The third pixel is on a second scanline which is prior in time to the first scanline. The marker data at the third pixel location is eliminated if it is determined, upon examining data of pixel locations adjacent to the third pixel location, that the elimination of the marker data at the third pixel location would maintain the connectivity of the marker line, the data at the third pixel location is maintained if it is determined that, upon examining the data of pixel locations adjacent to the third pixel location, the elimination of the marker data at the third pixel location would cause disconnectivity in the marker line.

A fourth aspect of the present invention is a method for thinning marker data stored in a buffer during a single pass scanning of a document. The method analyzes, during a single pass scan of the document, the data stored in pixel locations adjacent to a first pixel location. The first pixel location is associated with a scanline prior in time to a scanline being presently scan in the single pass scanning of the document. The method eliminates, during the single pass scan of the document, the marker data at the first pixel location if it is determined, upon examining data of pixel locations adjacent to the first pixel location, that the elimination of the marker data at the first pixel location would maintain the connectivity of the marker line.

A fifth aspect of the present invention is a system for thinning marker data stored in a buffer during a single pass scanning of a document. The system includes a first analyzer for analyzing, during a single pass scan of the document, the data stored in pixel locations adjacent to a first pixel location. The first pixel location is associated with a scanline prior in time to a scanline being presently scan in the single pass scanning of the document. A circuit then eliminates the marker data at the first pixel location if the first analyzer determines, upon examining data of pixel locations adjacent to the first pixel location, that the elimination of the marker data at the first pixel location would maintain the connectivity of the marker line.

Further objects and advantages of the present invention will become apparent from the following description of the various features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein.

DETAILED DESCRIPTION OF THE DRAWINGS

Figure 1:
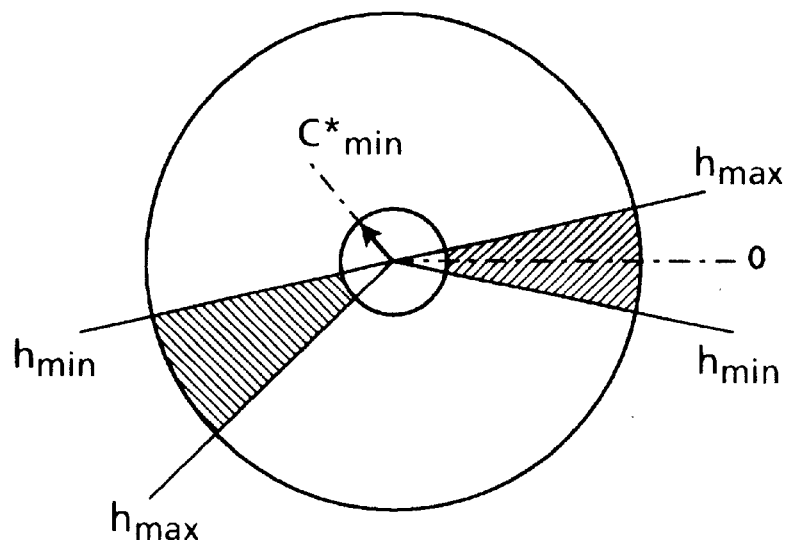
FIG. 1 illustrates a polar coordinate diagram showing possible boundary parameters for detecting a color marker.
Figure 2:
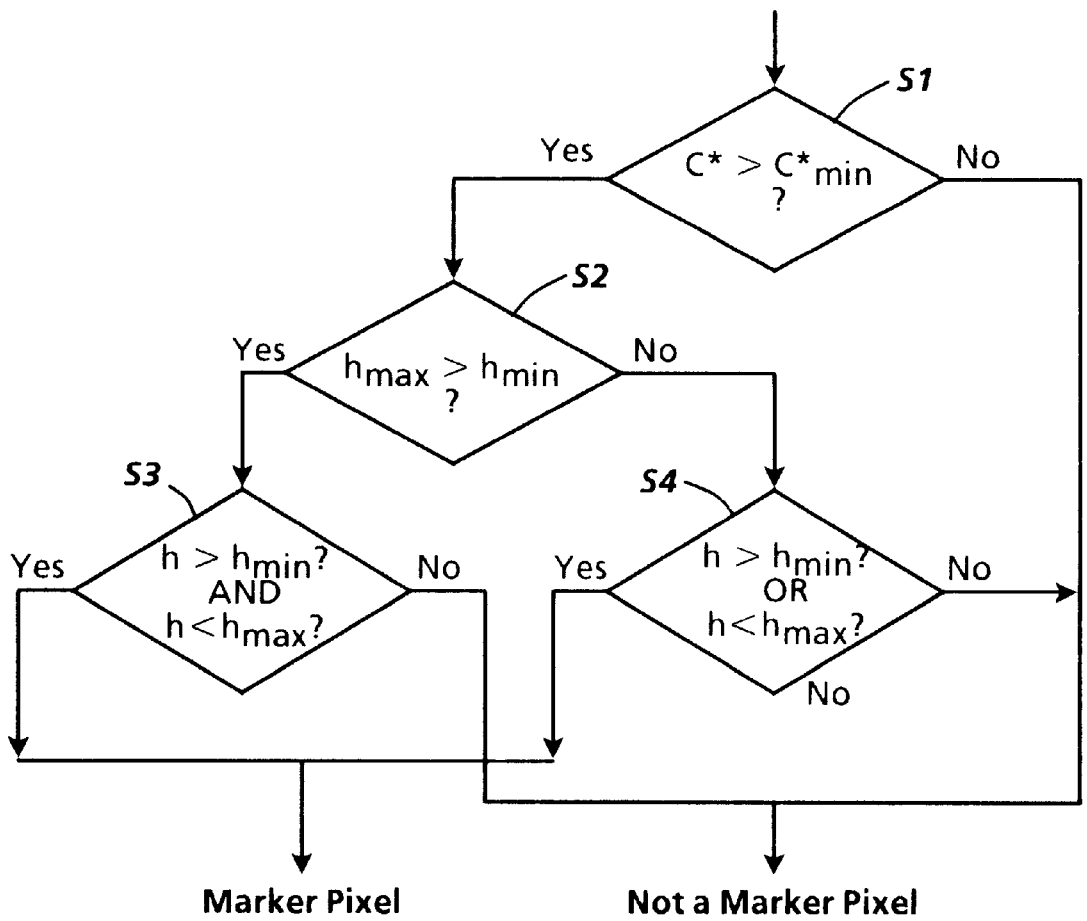
FIG. 2 shows a flowchart illustrating a conventional process for detecting a color marker.

The following will be a detailed description of the drawings illustrating the present invention. In this description, as well as in the drawings, like reference numerals represent devices or circuits or equivalent circuits which perform the same or equivalent functions.

Figure 6:
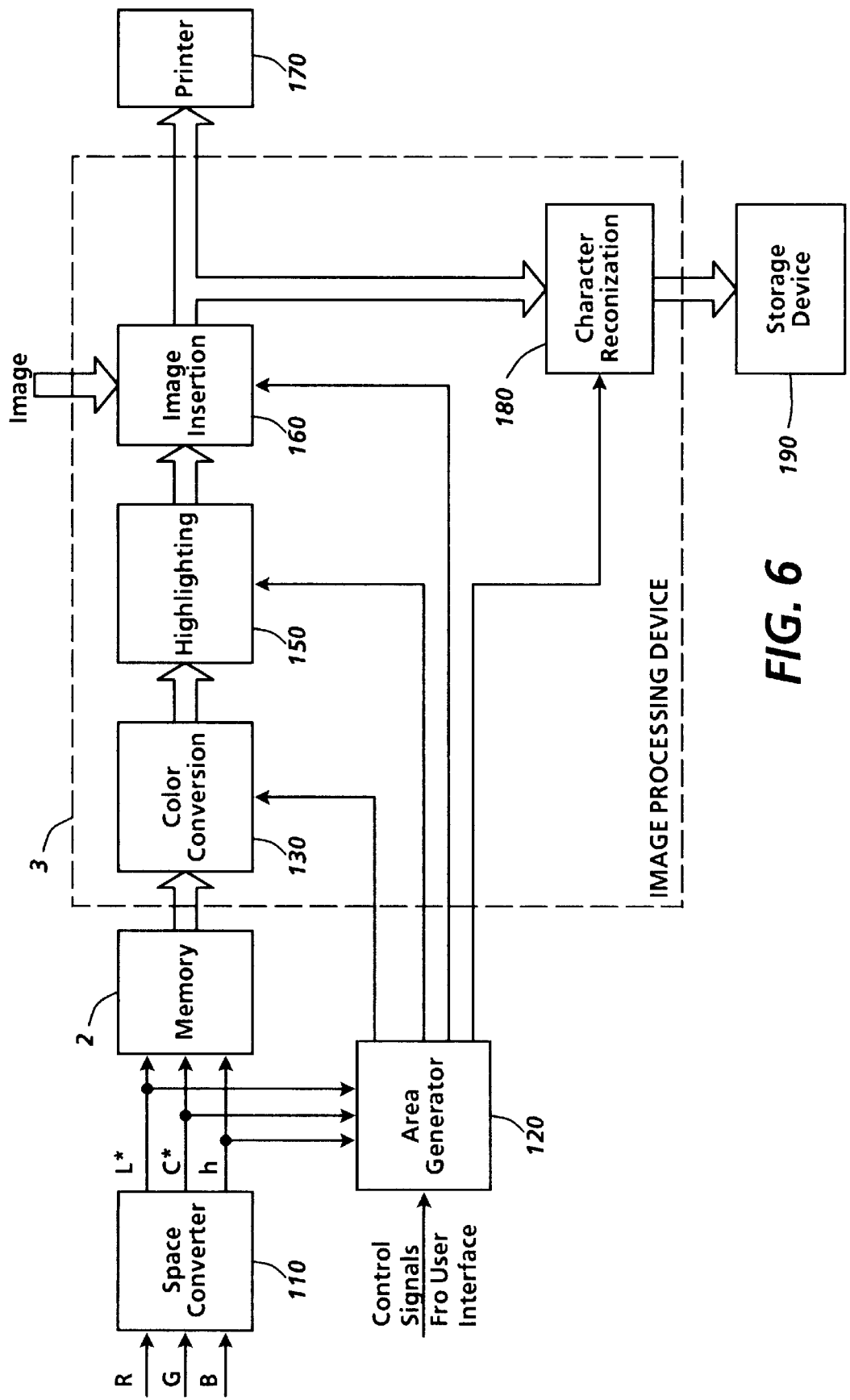
FIG. 6 shows a block diagram illustrating an image processing system implementing the present invention.

The present invention is applicable to a variety of photocopy machines, preferably color copy machines. With respect to a preferred embodiment of the present invention, an example of such a photocopier is described in U.S. Pat. No. 5,014,123 to Imoto, issued May 7, 1991. The entire contents of U.S. Pat. No. 5,014,123 are incorporated herein by reference. The relevant features of the color copy machine of U.S. Pat. No. 5,014,123 are illustrated in FIGS. 3, 4, and 6 of the present application.

Figure 3:
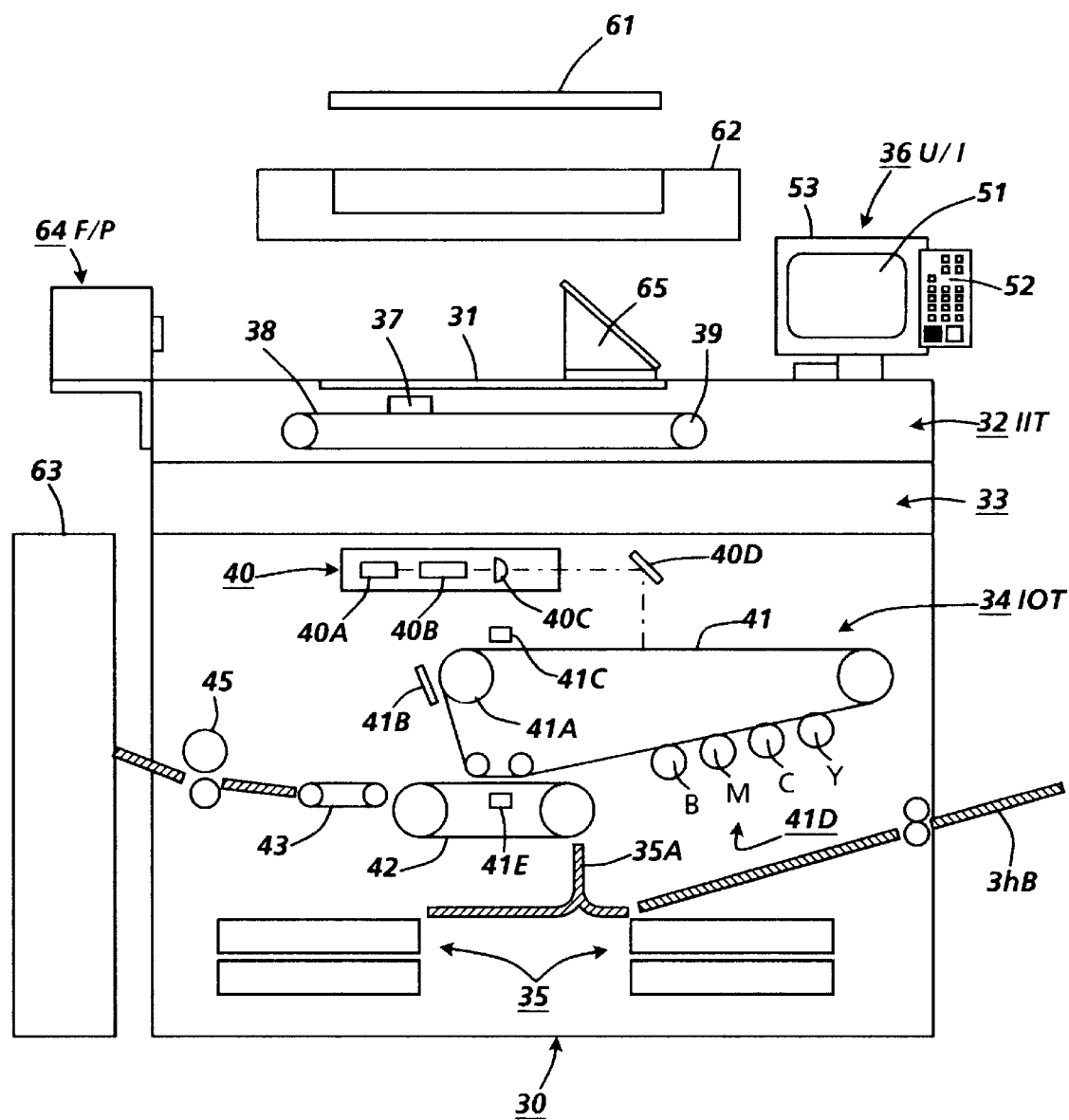
FIG. 3 is a schematic elevational view of an exemplary color copier that utilizes the various aspects of the present invention.
Figure 4:
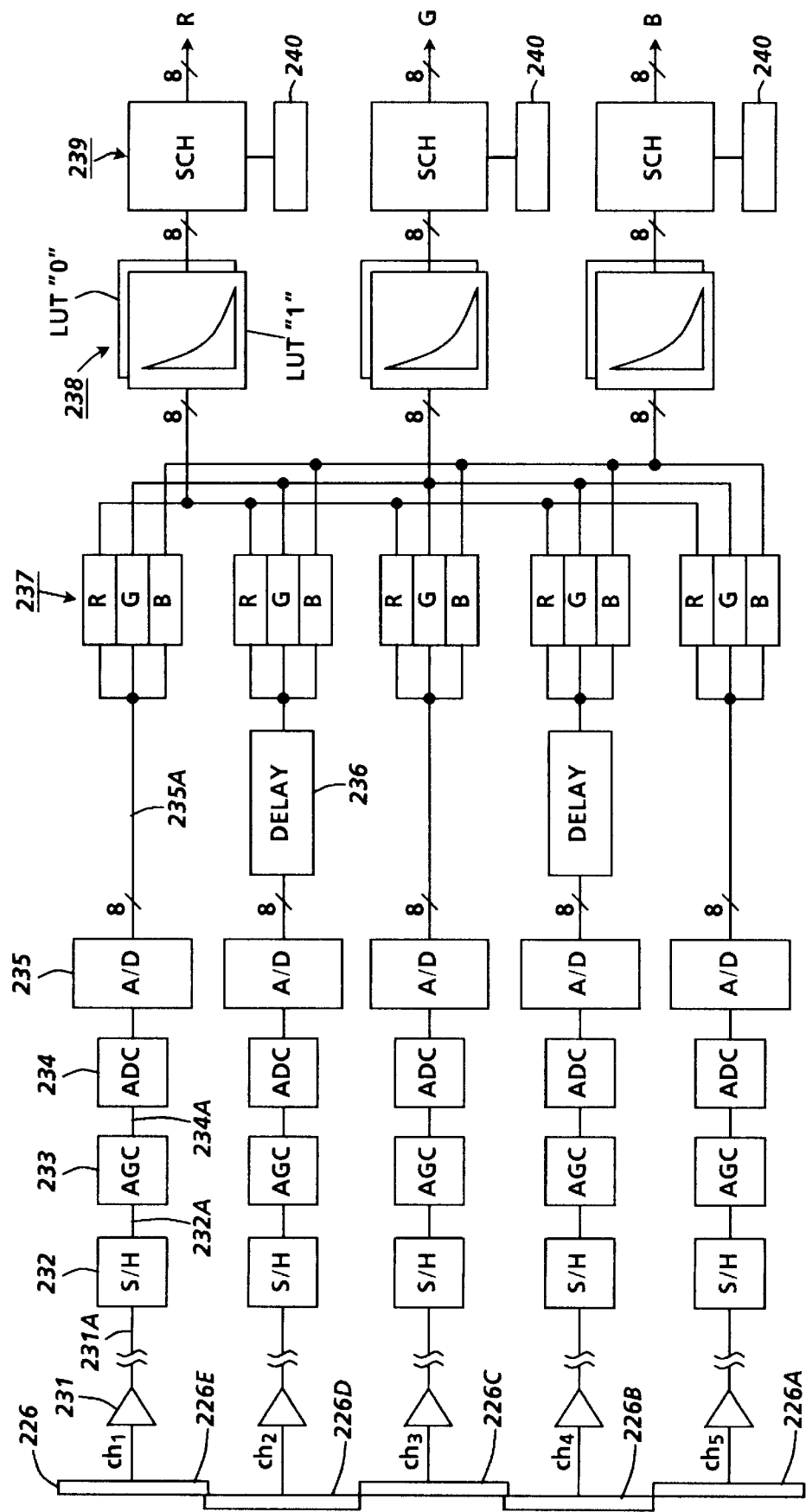
FIG. 4 shows a circuit illustrating an example of an arrangement of CCD line sensors and corresponding video image processing circuitry.

With respect to FIG. 3, this Figure illustrates the basic components of the color copying machine. More specifically, the color copying machine is composed of a base machine 30 which includes a glass plate 31 for carrying the original sheet thereon, an image input terminal 32, an electrical control system container 33, an image output terminal 34, a paper tray 35, and a user interface 36 and other optional items such as an editing pad 61, an automatic document feeder 62, or a sorter 63.

Electrical hardware is necessary for performing the control of the image input terminal, image output terminal, and user interface, mentioned above, wherein the hardware is installed on a plural number of boards for each processing unit. The boards are located in the electrical control system container 33, together with a system board for performing further control over these boards. Moreover, a master control board is located within this container for controlling the image output terminal, the automatic document feeder, the sorter, and so forth.

The image input terminal 32 is composed of an imaging unit 37, a wire 38 for driving the unit, a driving pulley 39, and so forth. The image input terminal 32 reads a color original sheet for each of the primary colors blue, green, and red by means of a CCD line sensor and a color filter provided inside the imaging unit 37. The imaging unit 37 converts the data to obtain digital image signals and outputs the digital signals to the image processing system.

In the image processing system, the blue, green and red signals fed from the image input terminal 32, mentioned above, are eventually transformed into primary colored toners, i.e. yellow, cyan, magenta, and black. However, prior to the conversion of the signals to printing signals, the digital signals are converted into a color space to facilitate more efficient image processing. Various data processing schemes are applied to the color space data to obtain an enhancing of reproduction fidelity in terms of coloration, chromatic gradation, precision, or fineness. The image processing system then converts the color space signals into harmonious gradation binary value toner signals of the processed color and outputs the signals to the image output terminal 34.

The image output terminal 34, which is provided with a scanner 40 and a photosensitive belt 41, converts the image signals from the above mentioned image processing system into optical signals at a laser output 40. The laser 40 forms a latent image, corresponding to the image on the original sheet, on the photosensitive material belt 41 by way of a polygon mirror 40b, focal lens 40c, and reflective mirror 40d. The photosensitive material belt 41, which is driven by the driving pulley 41a, has a cleaner 41b, a charging unit 41c, individual developing devices for yellow, magenta, cyan, and black, and a transfer device arranged therearound.

Opposite to this transfer device 41e is provided a transfer unit 42, which takes a sheet from the paper tray 35 via the paper transport channel 35a and transfers the colors in order of yellow, magenta, cyan, and black. The transfer unit 42 is rotated four turns, for example, for full color copying in four colors. The sheet of paper on which the image is so transferred is then transported from the transfer unit 42 via the vacuum transport device 43 to a fixing device 45, where the image is fixed onto the paper, and the paper is discharged therefrom. Moreover, the paper transport channel 35a is designed so as to accept paper fed alternatively through the single sheet inserter 35b.

The user interface 36 is designed for use by the user in making selections of the desired function and giving instructions regarding the conditions for execution of the selected functions. This system is provided with a color display unit 51 and a hardware control panel 52 installed by the side of the display panel. It is further combined with an infra-ray touch board 53, so that instructions can be given directly via the soft buttons on the screen.

The user interface 36 can be utilized in a variety of ways with respect to the present invention. For example, the user interface 36 can assist the operator to preprogram functions involving the color marker feature. More specifically, the soft buttons of the display screen can allow the operator to input the desired function of changing the image in the enclosed area (the area surrounded by the color marker) to the color of the marker prior to starting the copying process. This optional is effective in increasing the speed of the copying process when a multiple number of copies of the same image is desired. Moreover, the user interface 36 can include a hard button which dedicated function is to instruct the machine to carry out this conversion process. Other functions which may be implemented in a similar manner include the deletion and insertion functions.

Also, the image can be scanned in and the enclosed area can be displayed on the display screen for individual processing by the operator using the soft buttons. This second option is beneficial when implementing a character recognition process upon the scanned image or a detailed color to color conversion process as illustrated in FIGS. 22, 23, 24, 25, and 26.

A description will now be made of the optional items for the copying machine 30 The copy machine 30 may include an editing pad 61 which is an input device based on a system of coordinate. When the editing path 61 is placed on the platen glass plate 31, the editing pad 61 permits the editing of various types of images by means of an input pen or memory card. The copying machine 30 is also designed to accept the installation of existing automatic document feeder 62 and sorter 63.

The photocopying machine offers a fully automatic system covering the entire copying process from the inlet of copying work to the exitthereof while providing fully variegated and multifarious functions for dealing adequately with the user's need and at the same time producing a system which can be operated with ease owing to such features as selection of the functions, the selection of executing conditions, and the display of other items on the menu, which are put on display on the cathode ray tube screen, in the user interface.

A principal function of this system is the ability to make selections of various kinds of functions by touch operations via the soft buttons of the primary screen, with operations performed on the hardware control panel for making the switching of start, stop, all clear, ten key, interrupt, information, and language; i.e., the factors which cannot be delineated in the operational flow. Also, the system permits full color and black and white copying work with such simple operations that the copying machine can be used as though it were a conventional copying machine owing to the features permitting the selection of various types of editing functions, such as marker editing, business editing, and creative editing, by the touch on the pathway tab corresponding to the pathway representing the region for the selection of functions.

FIG. 4 illustrates the video signal processing circuit of the present invention. This video signal processing circuit reads the original sheet in color in the form of the reflexive ratio signals for each color red, green, and blue by means of a CCD line sensor 226 and converts the reflexive ratio signals into digital values as density signals.

The original sheet is read and resolved into the colors red, green, and blue for five channels which correspond to five divided parts by means of the five CCD line sensor units 226 in the imaging unit 37. The data is amplified by the amplifying circuit 231 up to the prescribed level, and then the data signals are transmitted to a circuit on the main unit side by way of a transmission cable connecting the unit and the main unit. Subsequently, in the sample hold circuit, SH 232, the signals are processed for rectification of the waveforms through the removal of noise components by means of a sample hold pulse.

However, since the photoelectric conversion characteristics of the CCD line sensors are different for each picture element and for each chip, the output from the different CCD line sensors, reading the original sheet with the same density, will be different so that the data will cause streaks or unevenness in the picture image data if the signals are outputted as they are. For this reason, it is necessary to apply various kinds of rectifying processes.

The gain control circuit 233 is a circuit for amplifying the output from the individual sensors up to a level adequate for the input range of the analog to digital conversion 235, and the individual sensors read the white reference data in advance before the reading of the original sheet. The data so obtained is converted into digital data and stored in the shading random access memory 240. This data is compared with the prescribed reference value and evaluated for an appropriate amplifying ratio. The digital data appropriate for the amplifying ratio is subjected to a digital to analog conversion and transmitted to an automatic gain control circuit 233 by which the gains of the individual sensors are set automatically.

The offset control circuit 34 is a control circuit which is referred to as the black level control. This control performs adjustments of the dark time output voltage of the individual sensors. For this purpose, the dark time output is read by the individual sensors while the fluorescent lamp is turned off. The data is converted into digital signals and stored in the shading random access memory 240. The data for one line is compared with the prescribed reference value and the offset value is then estimated. The control unit makes adjustments of the offset electric voltage at 256 stages. The output from the offset control circuit 34 is applied in such a way that the control of the output density will obtain the prescribed value in relationship to the density of the finally read original sheet.

The data which has been converted into digital values by the analog to digital converter 235 is outputted in the form of eight-bit data series forming a sequence green, blue, red, green, blue, red . . . The time lag amount setting circuit 236 is a memory device which stores data for a plural number of lines and has a construction corresponding to FIFO. This circuit stores in memory the signals from the line sensors 226b and 226d which are positioned in the first row and perform the scanning operation on the original sheet in advance. The stored data is then outputted in synchronism with the output of signals from the CCD line sensors 226a, 226c, and 226e subsequent to those sensors mentioned above and positioned in the second row.

The separating and synthesizing circuit 237 separates the red, green, and blue data for each of the CCD line sensors and thereafter serially synthesizes and outputs the data for one line of the original sheet by each of the red, green and blue parts of data in each of the CCD line sensors. The converter 238 is composed of a read only memory which stores a logarithmic conversion table. When the digital values are inputted as address signals to the read only memory, the converter converts this information of the reflexive ratios of red, green, and blue into information based on the density with respect to the logarithmic conversion table. With respect to the shading correction circuit 239, when there is a dispersion in the light distribution characteristics at the light source, or there is a decline in the amount of light at the end parts in case of light sources of fluorescent lamp, or there is any smear on the reflecting mirror, etc., the appearance of shading characteristics is caused by these factors.

Therefore, the light reflected; when the white board, which provides the reference density data for shading correction process, is irradiated; is inputted into the CCD line sensors at the time when the shading correction has started. The data is processed for analog to digital conversion and in the signal processing circuit as discussed above.

Figure 5:
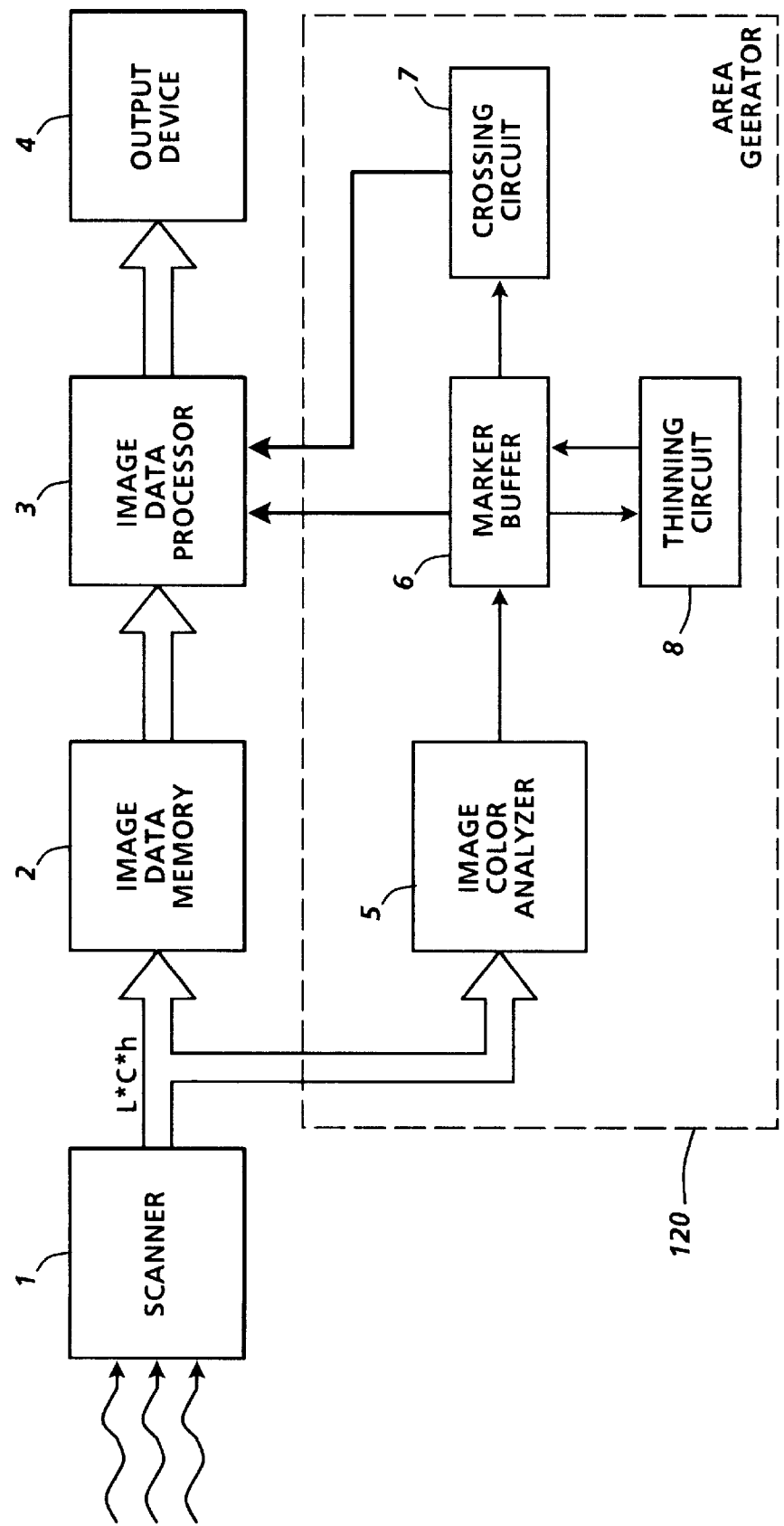
FIG. 5 shows a block diagram illustrating one embodiment of the present invention.

FIG. 5 illustrates a circuit diagram of one embodiment of the present invention which implements the marker editing functions described below with respect to FIG. 7. In FIG. 5, a scanner or other optical device receives the image data from the document being processed by the photocopier. This scanner 1 feeds the image data into an image data memory 2 which stores the image data for further processing. An image color analyzer 5 is also connected to the scanner 1 to determine if the data being outputted by the scanner 1 corresponds to a color marker. The result of the image color analysis carried out by the image color analyzer 5 is stored in a marker buffer 6 which is connected to a thinning circuit 8 that analyzes the data within the marker buffer, according to the preferred 3 pixel by 3 pixel window for marker thinning. The thinning circuit 8 processes the data within the marker buffer so as to eliminate all unnecessary marker data, thereby producing a skeletal trace of the marker.

The marker buffer 6 is also connected to a crossing circuit 7 which analyzes the thinned marker data to determine which pixels are within the marker area and which pixels are outside the marker area. The thinned marker data in marker buffer 6 is fed into an image data processor 3 so as to convert the image data associated with the marker pixel to a predetermined background value. Moreover, the results of the crossing analysis carried out by the crossing circuit 7 are also inputted into the image data processor so that the image data processor 3 can carry out the proper image processing steps upon the image data within the marker area.

Upon processing the image data received from the image data memory in response to the data received from the marker buffer 6 and the crossing circuit 7, the image data processor 3 outputs the finalized image data to an output device 4. The output device 4 can either store the image data, print the image data to produce a hard copy of the image, transmit the image data onto another device, or display the image data on the display screen.

FIG. 6 illustrates a block diagram showing an overall embodiment of the present invention which implements the features described above with respect to FIG. 5. In FIG. 6, a scanner or other optical device receives the image data from the document being processed by the photocopier. This scanner feeds the image data into a color space conversion circuit 110 which converts the RGB data into hue, chroma, and lightness data (L*C*h), for example. This hue, chroma, and lightness data is fed into an image data memory 2 which stores the image data for further processing and an area generator 120 which detects the area enclosed by the marker as described with respect to FIG. 5. The area generator 120 also receives control signals from the user interface 36 which was fed along the enclosed area information into the image processing device 3.

The information fed into the image processing device 3 from the area generator 120 is used to control the functions of the color conversion circuit 130, the highlighting circuit 150, image insertion circuit 160, and the character recognition circuit 180. If one of these circuits is supposed to process the image data being fed from the image memory 2, the data will be processed according to the control signals received the area generator 120. Otherwise, the circuit will allow the data from the memory to pass through without processing.

Upon processing the image data received from the image data memory in response to the data received from the area generator 120, the image data processor 3 outputs the finalized image data to a printer 170 or a storage device 190, for example. The image data processor 3 can also output the finalized image data to a transmitter to transmit the image data to another device or to a display screen to display the image data.

Figure 7:
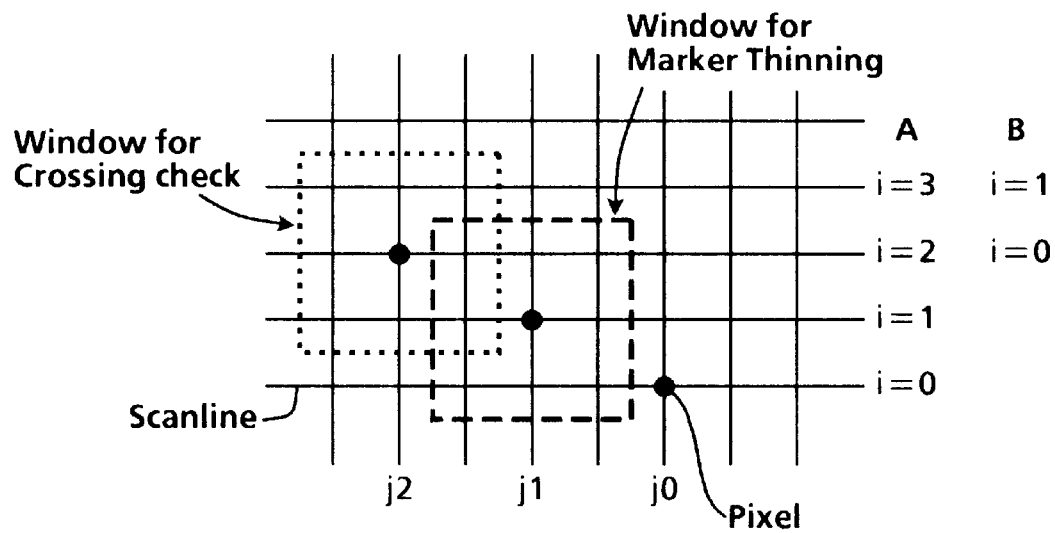
FIG. 7 illustrates a chronological relationship between the various processes of the marker editing function of the present invention.

FIG. 7 illustrates the chronological relationship between the scanning of the pixel, the marker thinning process of the present invention, and the crossing detection process of the present invention. With respect to FIG. 7, the location, j=j0 in the fast scan direction and scan line i=0 in the slow scan direction, shows the current pixel being scanned by the copy process. In FIG. 7, the current scanline is labeled 0 and the previous scanlines (i) are labeled 1, 2, 3, etc.

Also, with respect to FIG. 7, it is assumed that the image is processed from the top to bottom and from left to right. However, if the image is processed differently, the chronological relationship of FIG. 7 would remain the same, but the physical or spatial relationship would be changed to correspond to the new processing direction. Moreover, it is noted that FIG. 7 includes Columns A and Columns B. With respect to Column A, the "i" values correspond to the "i" values utilized in determining a location in arrays MBUF and BUF which will be discussed later, whereas Column B illustrates the "i" values for arrays MFLAG, IFLAG, and XSTART which will also be discussed later.

As illustrated in FIG. 7, a dashed line represents the window for the marker thinning process. In the marker thinning process, the pixel located at j=j1 and i=1 is the pixel under consideration for the thinning process. More specifically, the marker thinning process analyzes the pixels in the window for marker thinning to determine whether the pixel at j=j1 and i=1 can be removed or thinned out. It is noted that this window for marker thinning is centered on the scanline which is immediately prior in time to the scanline associated with the pixel being currently scanned. Thus, the present invention is able to carry out a thinning process during the actual scanning process of the document. Moreover, the locating of the central pixel of the thinning process on this scanline reduces the amount of memory required to process the marker data.

FIG. 7 also illustrates a dotted line which represents a window for the crossing detection. As with the marker thinning process, the crossing detection process analyzes all the pixels within the window for crossing detection to determine whether the pixel located at j2 and i=2 represents a crossover of the thin marker. It is noted that the center of the window for the crossing detection is centered on a scanline immediately prior to the central scanline of the window for the marker thinning process.

With respect to the present invention, the window for the marker thinning process must be centered on a scanline at least one scanline prior in time to the scanline being presently scanned in the slow scanline direction. Moreover, the central scanline of the window for crossing detection must be at least one scanline prior in time to the central scan line of the window for marker thinning. This delay in the situating of the two windows is necessary to effectively analyze the data in the thinning process and in the crossing detection process.

The actual thinning process of the present invention will now be described with respect to FIGS. 8(A)–8(D) and FIG. 9. FIGS. 8(A)–8(D) illustrate examples of marker pixel patterns encountered in the thinning process. As discussed previously, the pixels surrounding the central pixel of the window for marker thinning are analyzed to determine whether the marker data associated with the center pixel can be eliminated or thinned out. The result of the marker detection of the j0-th pixel in scan line i=0 is stored in an array MBUF[i][j] at MBUF[0][j0].

If a value within this array is 0, the pixel associated with the location is not a marker pixel. However, if a value within this array is non-zero, the pixel associated with the location is considered a marker wherein the non-zero value indicates which of one of many color markers that this pixel is associated therewith. If the value within the array is a marker pixel, the thinning process determines whether the pixel should be removed under certain conditions so that the marker curves can be properly thinned. The result of the thinning process can be stored in another array BUF[i][j].

The recursive thinning of the marker area utilized in the present invention can be realized for the pixel at i=1 and j=j1=(j0–2) as illustrated in FIG. 7 by examining the contents of the array MBUF and the array BUF within a 3 pixel by 3 pixel window centered on the pixel (i=1, j=j1). In the present invention, the array BUF is initially set to zero. If the value at MBUF[1][j1] is 0, indicating a non-marker pixel, the value in BUF[1][j1] remains zero. However, if the value at MBUF[1][j1] is not zero, indicating a marker pixel, and upon analysis of the values of the pixels surrounding this marker pixel it is determined that the removal of this marker pixel will not create disconnectivity between the pixels already processed and those pixels yet to be processed, the value at BUF[1][j1] is set to zero. However, if upon analyzing the pixel values in the neighborhood of the marker pixel in question indicates that the removal of this marker pixel will create disconnectivity between the pixels already processed and those pixels yet to be processed, the value at BUF[1][j1] is set to one.

FIGS. 8(A)–8(D) illustrate various examples of marker pixel patterns that are encountered in a thinning process. More specifically, these Figures will be utilized to explain the thinning process and which pixels can be removed. For the look-up table 85 outputs the binary bit value illustrated in the columns labeled 'OUT'. For example, if the inputs to the ports0–7 represent the decimal value 1, the output from the look-up table 85 would be a 0. The output from the look-up table 85 is inputted into an AND gate 87 which produces the value to be stored in the array BUF at the location corresponding to the center pixel of the window for marker thinning, in this example, BUF[1][j1].

TABLE

Figure 8A:
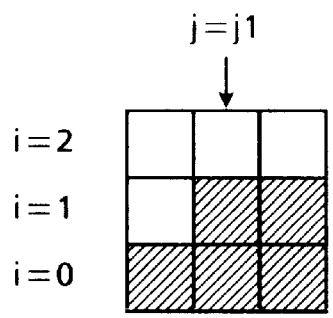
FIGS. 8(A)–8(D) show examples of marker pixel patterns encountered in the thinning process of the present invention.
Figure 8B:
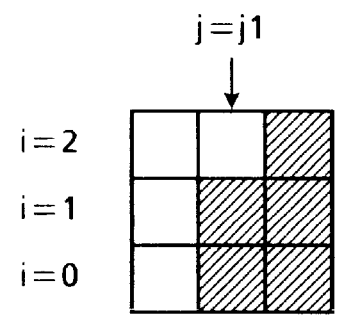
Figure 8C:
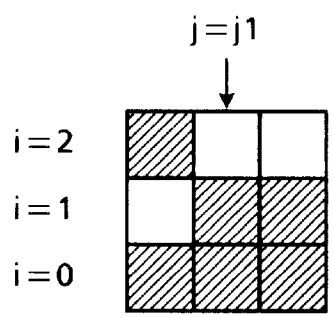
Figure 8D:
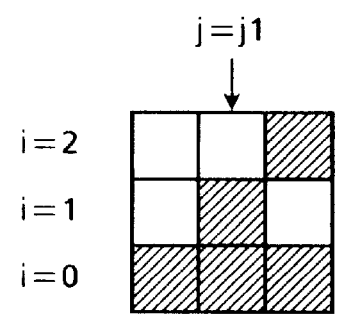

| IN | OUT | IN | OUT | IN | OUT | IN | OUT | IN | OUT | IN | OUT | IN | OUT | IN | OUT |
|----|-----|----|-----|----|-----|----|-----|----|-----|----|-----|----|-----|----|-----|
| 0  | 0 | 32 | 0 | 64 | 0 | 96  | 0 | 128 | 0 | 160 | 1 | 192 | 0 | 224 | 0 |
| 1  | 0 | 33 | 1 | 65 | 1 | 97  | 1 | 129 | 1 | 161 | 1 | 193 | 1 | 225 | 1 |
| 2  | 0 | 34 | 1 | 66 | 1 | 98  | 1 | 130 | 1 | 162 | 1 | 194 | 1 | 226 | 1 |
| 3  | 0 | 35 | 1 | 67 | 1 | 99  | 1 | 131 | 1 | 163 | 1 | 195 | 1 | 227 | 1 |
| 4  | 0 | 36 | 1 | 68 | 1 | 100 | 1 | 132 | 1 | 164 | 1 | 196 | 1 | 228 | 1 |
| 5  | 1 | 37 | 1 | 69 | 1 | 101 | 1 | 133 | 1 | 165 | 1 | 197 | 1 | 229 | 1 |
| 6  | 0 | 38 | 1 | 70 | 1 | 102 | 1 | 134 | 1 | 166 | 1 | 198 | 1 | 230 | 1 |
| 7  | 0 | 39 | 1 | 71 | 1 | 103 | 1 | 135 | 1 | 167 | 1 | 199 | 1 | 231 | 1 |
| 8  | 0 | 40 | 0 | 72 | 0 | 104 | 0 | 136 | 1 | 168 | 1 | 200 | 0 | 232 | 0 |
| 9  | 0 | 41 | 0 | 73 | 0 | 105 | 0 | 137 | 1 | 169 | 1 | 201 | 0 | 233 | 0 |
| 10 | 0 | 42 | 0 | 74 | 0 | 106 | 0 | 138 | 1 | 170 | 1 | 202 | 0 | 234 | 0 |
| 11 | 0 | 43 | 0 | 75 | 0 | 107 | 0 | 139 | 1 | 171 | 1 | 203 | 0 | 235 | 0 |
| 12 | 1 | 44 | 1 | 76 | 1 | 108 | 1 | 140 | 1 | 172 | 1 | 204 | 1 | 236 | 1 |
| 13 | 1 | 45 | 1 | 77 | 1 | 109 | 1 | 141 | 1 | 173 | 1 | 205 | 1 | 237 | 1 |
| 14 | 0 | 46 | 0 | 78 | 0 | 110 | 0 | 142 | 1 | 174 | 1 | 206 | 0 | 238 | 0 |
| 15 | 0 | 47 | 0 | 79 | 0 | 111 | 0 | 143 | 1 | 175 | 1 | 207 | 0 | 239 | 0 |
| 16 | 0 | 48 | 1 | 80 | 0 | 112 | 0 | 144 | 0 | 176 | 1 | 208 | 0 | 240 | 0 |
| 17 | 1 | 49 | 1 | 81 | 1 | 113 | 1 | 145 | 1 | 177 | 1 | 209 | 1 | 241 | 1 |
| 18 | 0 | 50 | 1 | 82 | 0 | 114 | 0 | 146 | 0 | 178 | 1 | 210 | 0 | 242 | 0 |
| 19 | 0 | 51 | 1 | 83 | 0 | 115 | 0 | 147 | 0 | 179 | 1 | 211 | 0 | 243 | 0 |
| 20 | 0 | 52 | 1 | 84 | 0 | 116 | 0 | 148 | 0 | 180 | 1 | 212 | 0 | 244 | 0 |
| 21 | 1 | 53 | 1 | 85 | 1 | 117 | 1 | 149 | 1 | 181 | 1 | 213 | 1 | 245 | 1 |
| 22 | 0 | 54 | 1 | 86 | 0 | 118 | 0 | 150 | 0 | 182 | 1 | 214 | 0 | 246 | 0 |
| 23 | 0 | 55 | 1 | 87 | 0 | 119 | 0 | 151 | 0 | 183 | 1 | 215 | 0 | 247 | 0 |
| 24 | 1 | 56 | 1 | 88 | 0 | 120 | 0 | 152 | 1 | 184 | 1 | 216 | 0 | 248 | 0 |
| 25 | 1 | 57 | 1 | 89 | 0 | 121 | 0 | 153 | 1 | 185 | 1 | 217 | 0 | 249 | 0 |
| 26 | 0 | 58 | 0 | 90 | 0 | 122 | 0 | 154 | 0 | 186 | 0 | 218 | 0 | 250 | 0 |
| 27 | 0 | 59 | 0 | 91 | 0 | 123 | 0 | 155 | 0 | 187 | 0 | 219 | 0 | 251 | 0 |
| 28 | 1 | 60 | 1 | 92 | 0 | 124 | 0 | 156 | 1 | 188 | 1 | 220 | 0 | 252 | 0 |
| 29 | 1 | 61 | 1 | 93 | 0 | 125 | 0 | 157 | 1 | 189 | 1 | 221 | 0 | 253 | 0 |
| 30 | 0 | 62 | 0 | 94 | 0 | 126 | 0 | 158 | 0 | 190 | 0 | 222 | 0 | 254 | 0 |
| 31 | 0 | 63 | 0 | 95 | 0 | 127 | 0 | 159 | 0 | 191 | 0 | 223 | 0 | 255 | 0 | example, the center pixel in FIGS. 8(A) and 8(B) can be removed because the removal of these marker pixels will not create disconnectivity between the pixels already processed and those pixels yet to be processed. On the other hand, the center pixels in FIGS. 8(C) and 8(D) should be retained because the removal of these pixels will create disconnectivity between the pixels already processed and those pixels yet to be processed. It is noted that for all pixels associated with this scanline i=2 and those pixels associated with the scanline i=1 and j is less than ji, the thin results from the array BUF[i][j] can be used in producing the pattern for analysis.

Figure 9:
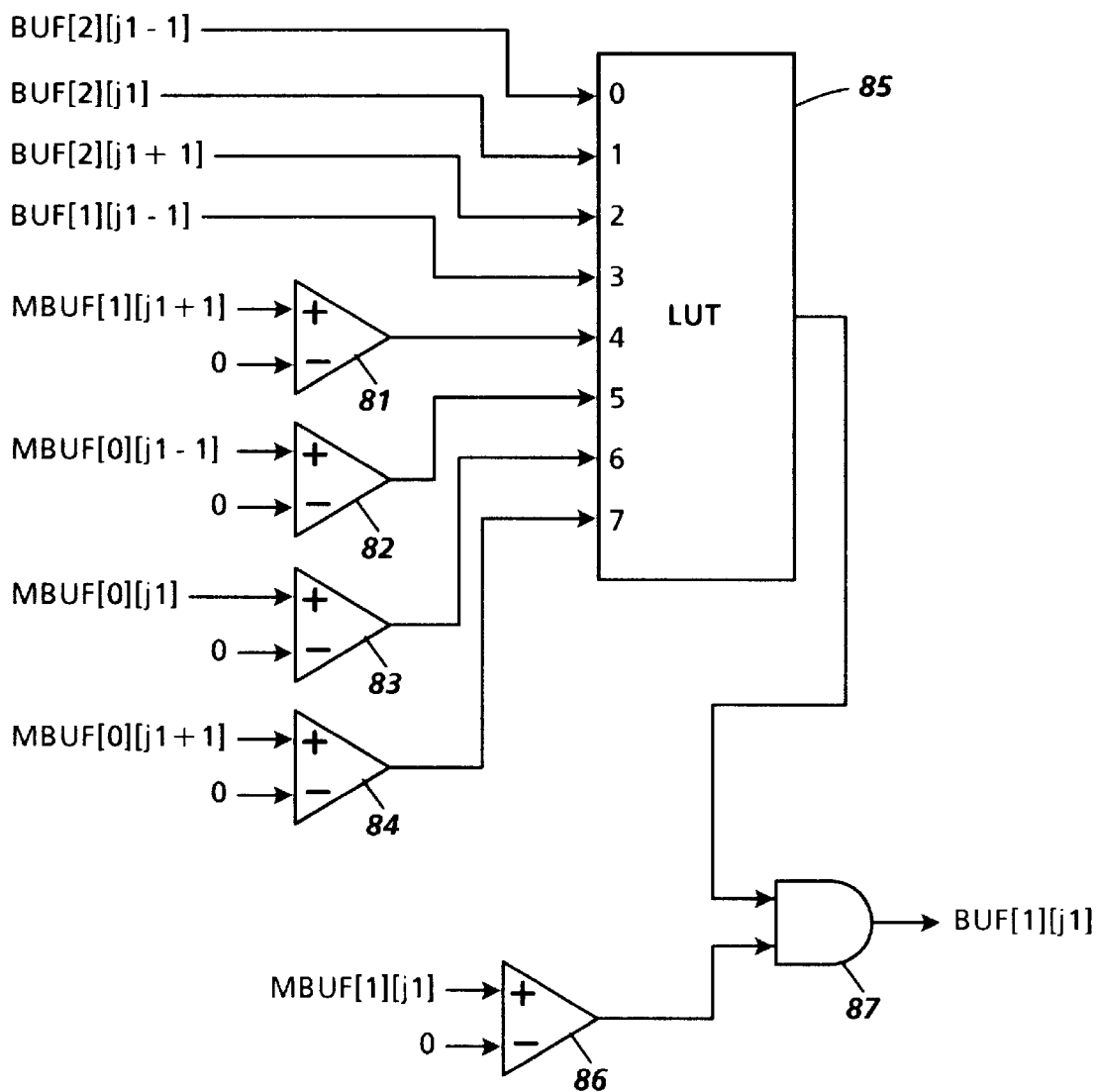
FIG. 9 shows a circuit diagram illustrating one embodiment of the present invention for thinning of marker pixels utilizing a look-up table.

One implementation of this thinning process is illustrated in FIG. 9. FIG. 9 illustrates the circuit used to decide whether to remove the center pixel of the window for marker thinning. This circuit utilizes a look-up table with 256 addresses corresponding to all possible patterns of the 8 pixels which surrounds the central pixel within a 3 pixel by 3 pixel window. An example of the values for the look-up table are set forth below.

With respect to the table set forth below, the column labeled 'IN' reflects the decimal value of the binary word inputted to the look-up table at ports 0–7. Upon receiving a binary word equivalent to the values listed in the IN column, FIG. 9 also includes a plurality of comparators 81–84 and 86 which determine whether the data being received from the array MBUF is marker data or not. For example, if the data being received from the array MBUF at the center pixel of the window for marker thinning is not marker data, comparator 86 will output a low signal thus automatically causing the value in the array BUF at the central pixel to be set to 0. This operation is clearly illustrated in FIG. 9.

If the image is processed from left to right and from top to bottom, the recursive thinning tends to erode the marker to the right and to the bottom. However, such an erosion is overcome since the original marker pixels can be explicitly identified and excluded from being classified as interior pixels even though the original pixel could be inside or outside of the thinned marker trace.

Once the marker curve has been thinned, the crossing of a scanline with the thin marker trace can be determined utilizing another 3 pixel by 3 pixel window as illustrated in FIG. 7. More specifically, as illustrated in FIG. 7, the center pixel of the window should be located on a scanline which is at least one scanline prior in time to the scanline having the central pixel for the window for marker thinning. In the example illustrated in FIG. 7, the central pixel of the window for crossing detection is on scanline i=2 in the slow scan direction and at location j=j2=(j0–4) in the fast scan direction. By having the window located no nearer than this to the central pixel of the window for marker thinning, the pixels immediately surrounding the central pixel for the window for crossing detection will have already been thinned by the thinning process.

Figure 10A:
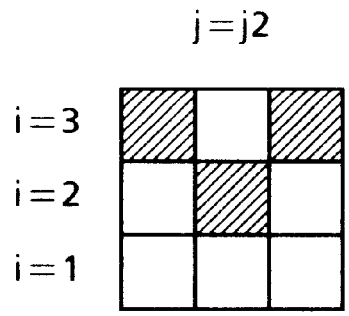
FIGS. 10(A)–10(F) show examples of thin marker patterns encountered by the crossover detection function of the present invention.
Figure 10B:
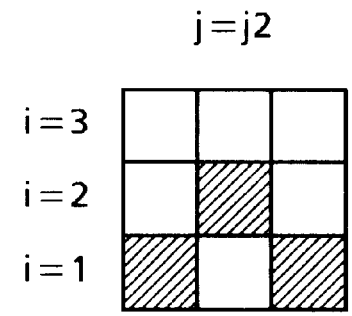
Figure 10C:
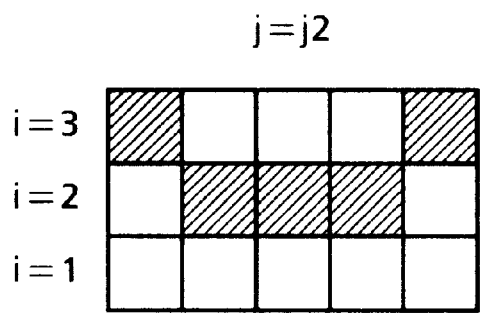
Figure 10D:
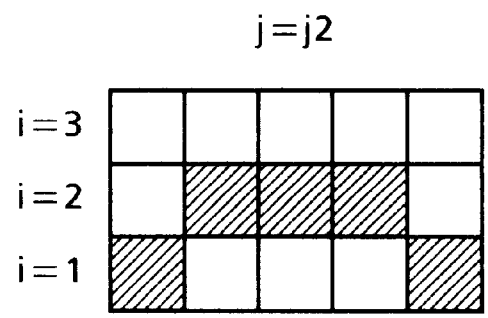
Figure 10E:
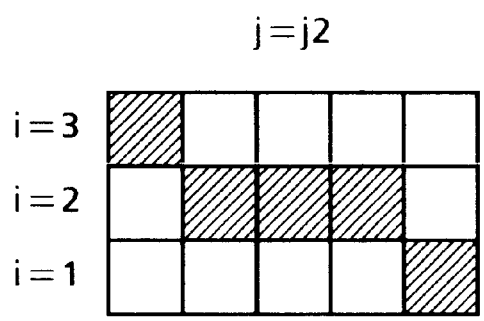
Figure 10F:
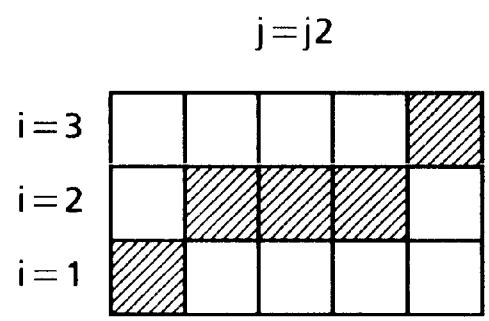

FIGS. 10(A)–10(F) illustrate examples of thin marker patterns encountered when determining the crossing of the center scanline. FIGS. 10(A)–10(D) illustrate the examples of marker pixels that are either a peak, valley, or horizontal segment. In such instances, the examples illustrated in FIGS. 10(A)–10(D) are not be counted as a crossover of the marker. FIGS. 10(E) and 10(F) illustrate horizontal segments which represent a crossover of the marker line.

Since the present invention is capable of recognizing a plurality of marker colors, wherein "N" is the actual number of marker colors, "N" number of flags are needed to indicate if a pixel is inside of any of the N color markers. These flags are stored in an array INSIDE[M] with M=0 to N-1. The flags are all initialized to zero at the beginning of the scanline. Upon encountering a crossing of a color marker, the INSIDE flag will be toggled. For example, the INSIDE [N-1]FLAG will be toggled with each crossing of the Nth marker trace. Moreover, to keep track of the curvature of the marker trace, two additional flags are needed, UP and DOWN. These two additional flags, UP and DOWN, are used to keep track of the situation when a horizontal marker trace is encountered, as illustrated in FIGS. 10(C)–10(F). More specifically, the UP and DOWN flags represent the vertical directional relationship of the marker data pixel in the previous vertical column. In other words, if the marker data pixel in the previous vertical column was in a scanline above (a scanline having been scanned prior in time to the scanline of the pixel being presently processed) the presently processed pixel, the UP flag would be set. On the other hand, if the marker data pixel in the previous vertical column was in a scanline below (a scanline having been scanned subsequent in time to the scanline of the pixel being presently processed) the presently processed pixel, the DOWN flag would be set.

Figure 11:
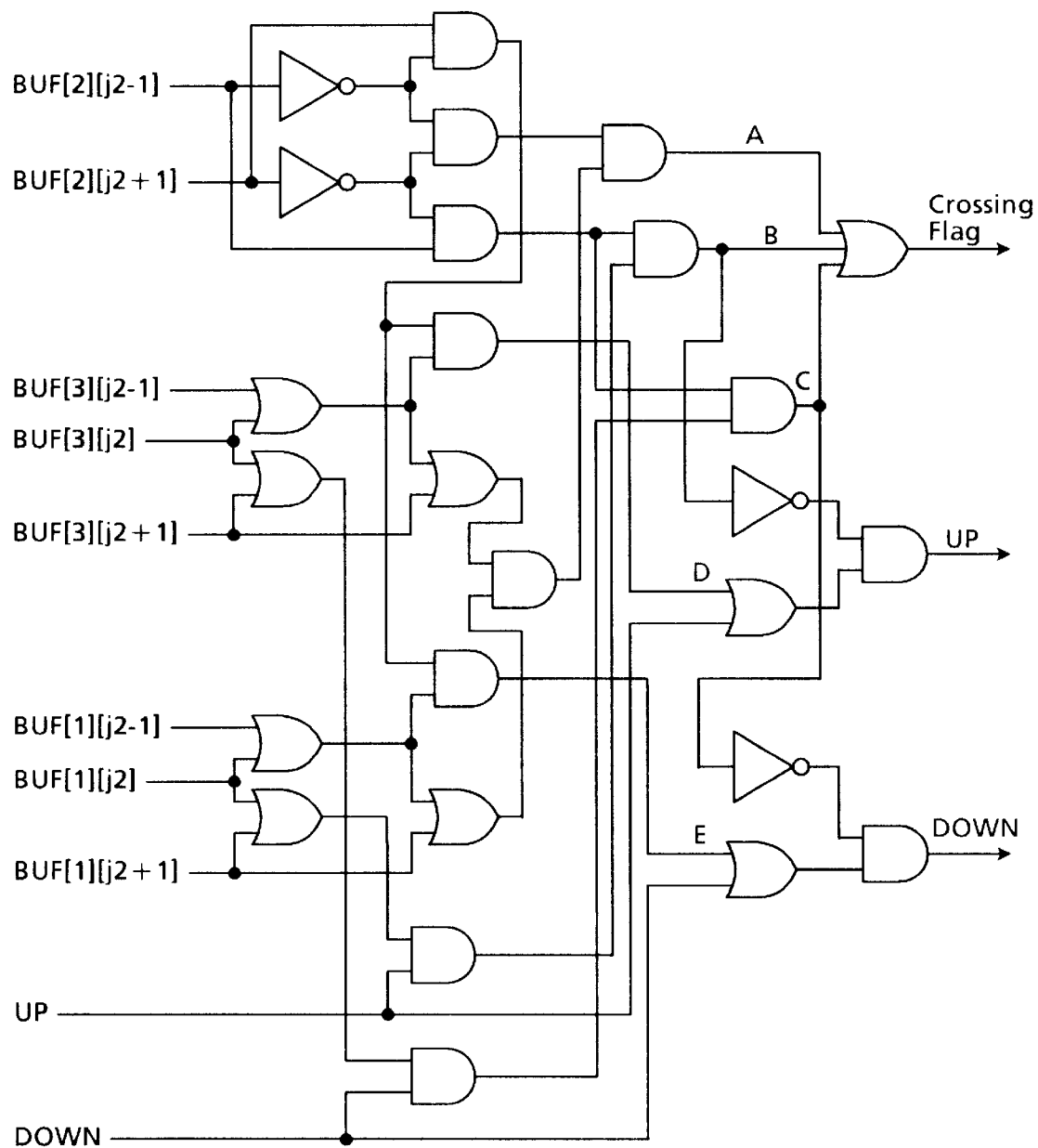
FIG. 11 shows a circuit diagram illustrating one embodiment of the present invention which detects the crossover of the marker trace.
Figure 12A:
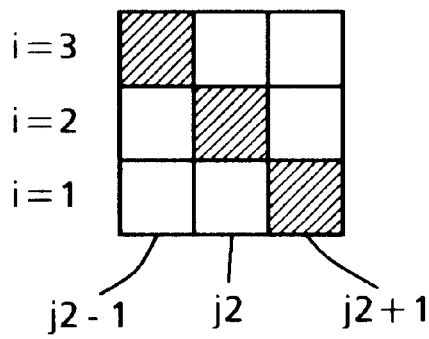
FIGS. 12(A)–12(E) illustrate other examples of thin marker patterns utilized in describing FIG. 11.
Figure 12B:
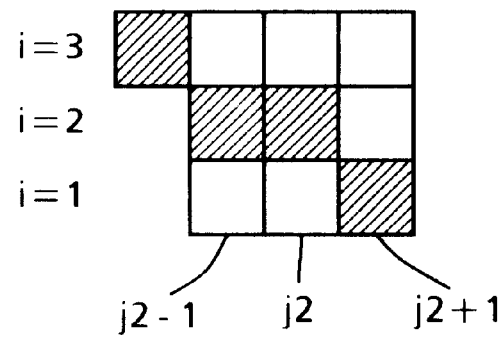
Figure 12C:
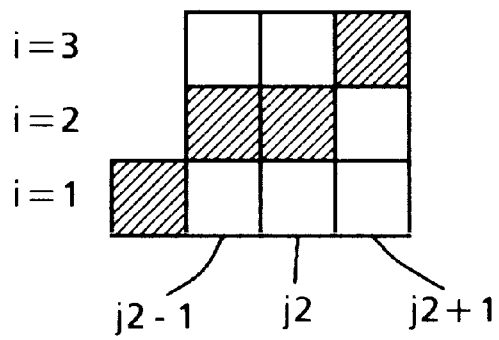
Figure 12D:
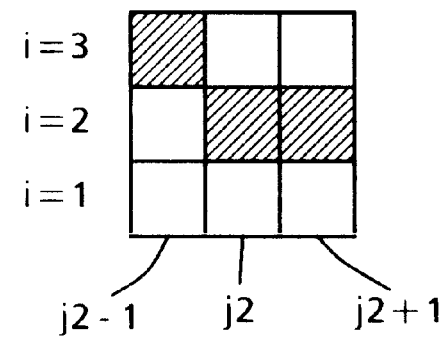
Figure 12E:
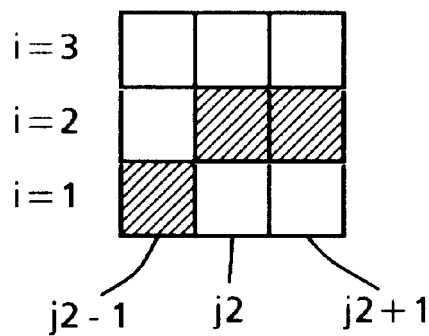

FIG. 11 illustrates a logic circuit which can generate the crossing flags and the UP and DOWN flags. As illustrated in FIG. 11, all the surrounding pixels are inputted into the logic circuit to determine whether the central pixel represents a crossing point and whether the crossing point corresponds to up or down situations. Moreover, FIGS. 12(A)–12(E) provide examples of pixel patterns which would produce positive output at the different locations labeled A–E, respectively, in FIG. 11. For example, FIG. 12(A) would give a positive output at location A of FIG. 11.

Figure 13:
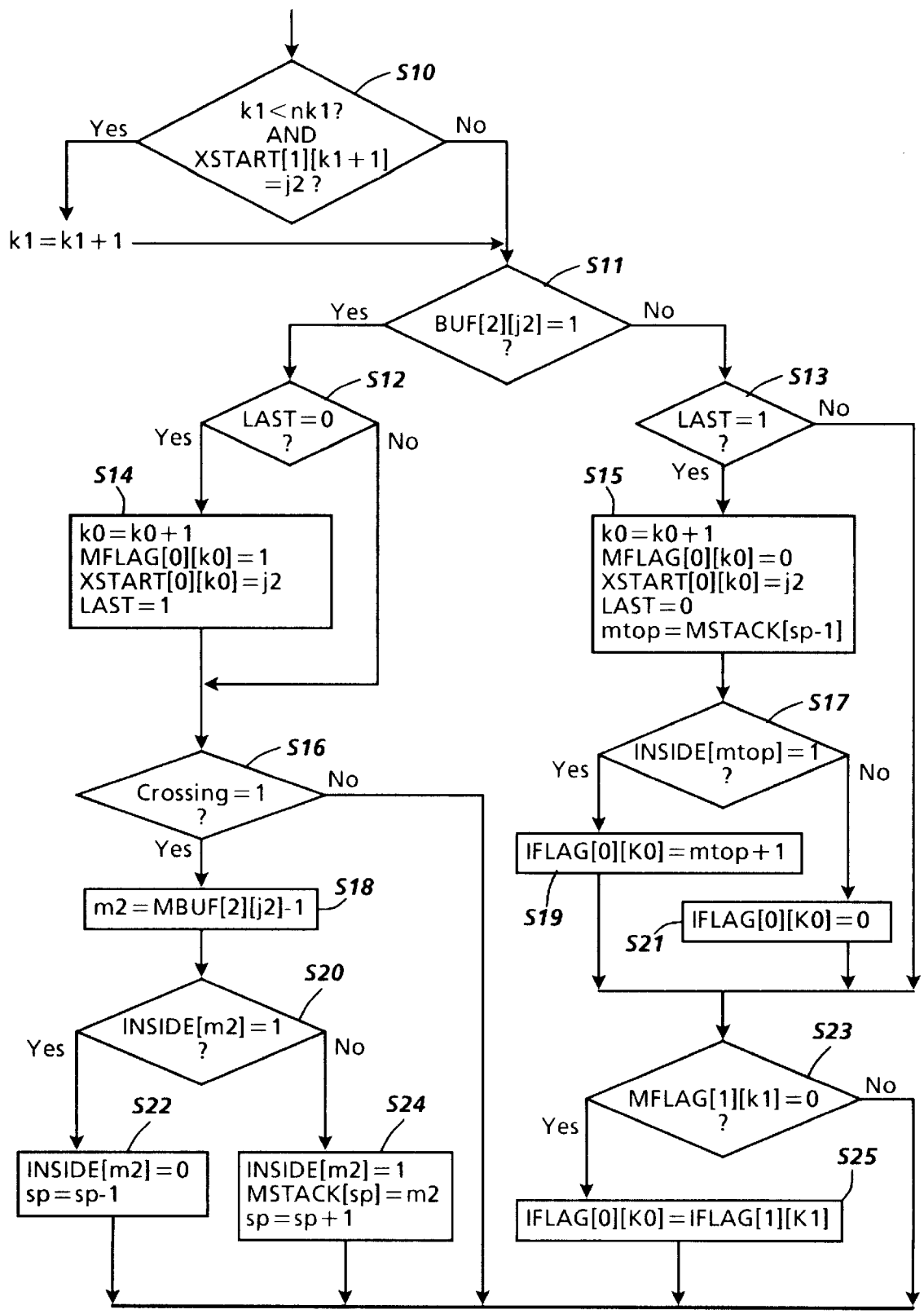
FIG. 13 illustrates a flowchart for determining spans of exterior, thinned marker, and interior pixels.

FIG. 13 illustrates a flowchart for determining spans of exterior pixels, thinned marker pixels, and interior pixels. Each scanline is composed of spans of exterior pixels, thinned marker pixels, and interior pixels. Each span is characterized by two flags and a starting coordinate. A one bit flag, MFLAG[0][k], is used to indicate whether the span is composed of thinned marker pixels or not. The index 0 refers to the scan line i=2 in FIG. 7 and k is an index for each span. Another flag of N+1 bits, IFLAG[0][k], indicates a span of interior or exterior pixels. A zero value in IFLAG indicates a span of pixels exterior to all of the marker loops. A value of m would indicate the span is an interior span of the m-th color marker. An integer array XSTART[0][k] is used to store the starting position of the k-th span in scanline i=2. The status of the spans is determined at scanline location i=2 and j=j2 based on the INSIDE flag and the stored span information MFLAG[1][k], IFLAG[1][k], and XSTART[1][k] of the previous scanline at i=3.

The spans are determined on scanline i=2, following the flowchart in FIG. 13. It is assumed that a pixel status flag LAST, the span starting position XSTART[0][k0], and two span indices k0 and k1 are initialized to zero at the beginning of the scanline. The flag LAST stores the MFLAG of the previous pixel. Initially, step s10 determines if k1 is less than nk1 and XSTART[1][k1+1]=j2. If this determination is positive, k1 is incremented, and the process proceeds to step s11. It is noted that this incrementation of k1 is the updating of the index k1 before it's use. That is, if k1 is less than nk1 and j2 is equal to XSTART[1][k1+1], k1 is incremented. The parameter nk1is the number of spans in scanline i=3 and XSTART[1][nk1] is set to the number of pixels at the end of a scanline.

At step si 1, the process determines if BUF[2][j2 ] is equal to one. If this is true, the process proceeds to step s12 to determine if LAST equals zero. If BUF[2][j2] is one and LAST is zero, a new thinned marker span has been encountered. At step s14, index k0 is incremented, MFLAG[0][k] and LAST are set to one, and XSTART[0][k] is set to the pixel index j2. The process then proceeds to step s16 where the crossing is checked. Also, if BUF[2][j2] is one and LAST is not zero, the process also proceeds to step s16 where the crossing is checked. If a crossing is detected at step s16, the appropriate INSIDE[m2] flag is toggled at step s18 and MBUF[2][j2]–1 is set to color index m2.

To handle the case of one marker loop inside the other, a stack is needed to keep track of the inner most marker color. In FIG. 13, a stack, MSTACK, is implemented as an array having the dimensions N and an index sp according to the next available element. The index sp is set to zero at the beginning of each scanline. If a marker crossing has occurred and step s20 determines that the appropriate INSIDE[m2] flag is off before toggling, the marker index m2 is put on the stack at step s24; i.e., MSTACK[sp] is set to m2 and sp is incremented. If a marker crossing has occurred, and step s20 determines that the appropriate INSIDE[m2] flag is on before toggling, this indicates the leaving of a loop of color M, and thus, at step s22 the stack pointer sp is decremented.

If BUF[2][j2] is zero and step s13 determines that LAST is one, the beginning of a non-marker span has been indicated and the process proceeds to step s15. At step s15, k0 is incremented and MFLAG[0][k0] and LAST are set to zero, XSTART[0][k0] is set to pixel index j2, and the process proceeds to step s17. The IFLAG[0][k0] is set to $m_{top}+1$, if step s17 determines that the flag INSIDE[$m_{top}$] is set, where mtop is a current marker color index, with a value from 0 to m–1, on the top of the stack. If INSIDE[$m_{top}$] is zero, IFLAG[0][k0] is set to zero at step s21, indicating an exterior span of pixel. For each non-marker pixel; i.e., BUF[2][j2] equals zero, the status of MFLAG[1][k1] is also checked in the previous scanline at step s23. If MFLAG[1][k1] is zero, indicating a connected non-marker span, IFLAG[0][k0] is set to IFLAG[1] [K1] at step s25, overriding any previous value of IFLAG[0][k0].

The span status, MFLAG, IFLAG, and XSTART, provides the necessary information for identifying interior pixels. The user specified image processing or color conversion can then be performed upon the interior pixels in this scanline. This color editing process is illustrated by the flowchart of FIG. 14.

For the pixel at i=3 and j=j2, step s50 determines if MBUF[3][j2] is not zero, indicating an original marker pixel. If the determination is true, at step s51, lightness, chroma and hue indicated by Lv, Cv and hv will be set to that of a predetermined background value indicated by $L_{bkg}$, $C_{bkg}$ and $h_{bkg}$. If MBUF[3][j2] is zero and step s52 determines that IFLAG[1][k1] is not zero, the pixel is inside a marker loop, and step s53 sets IFLAG[1][k1]−1 equal to color index m3, and the appropriate blanking, inverting, and color change operations are carried out.

Figure 14:
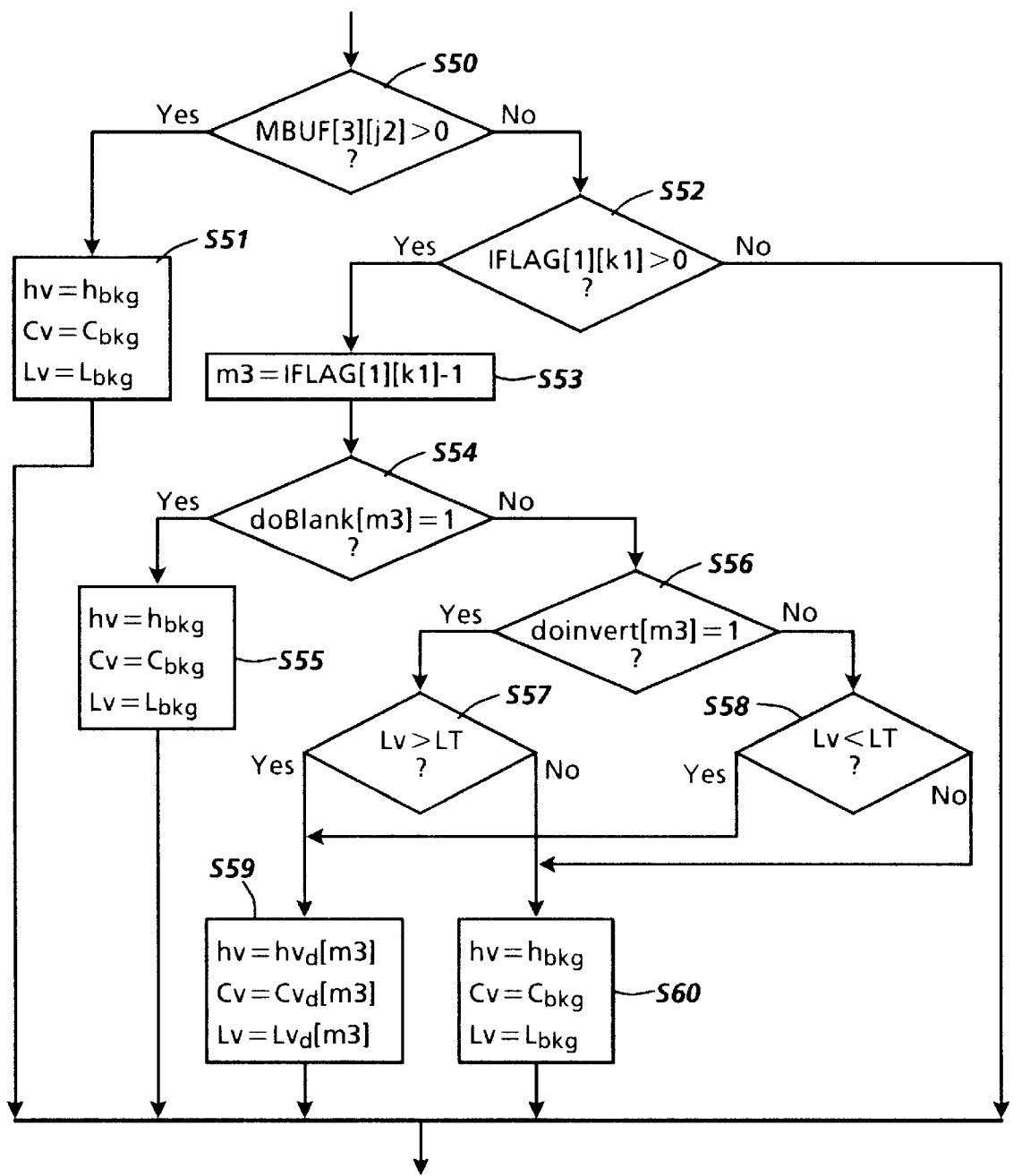
FIG. 14 illustrates a flowchart for color editing of interior pixels.

In FIG. 14, the flag doBlank specifies erasing of all the interior pixels, and doInvert specifies changing black to a background color and white to a color. The destination color, lightness, chroma and hue, specified for pixels inside the marker are set to index m3; i.e., $Lv_d[m3]$, $Cv_d[m3]$, and $hv_d[m3]$ are set to m3. The parameter LT is a specified threshold in lightness to separate the interior black pixel from the interior white pixel.

As noted above, the information in the arrays contain span status. Once this span information is image processed with the image data, the span information can be deleted. Thus, the memory capacity of the arrays can be minimized when image processing the scanned image data concurrently with the establishment of span data. In other words, both the thinning process and the cross counting process may only require arrays having a capacity no greater than four scanlines of data. Moreover, it is noted that each marker color could be assigned individual single bit arrays for certain aspects of the data needing to be stored.

With respect to the marker editing function of the present invention, the marker editing function is a function for performing editing work and processing work in an area surrounded by a marker. This function is applicable to documents, and consequently the original sheets are marked by various color markers. The images within the specified area outlined by the markers are processed according to the selected functions which may be selected by the soft buttons on the cathode ray tube or hard buttons on the panel next to the cathode ray tube. The areas other than the area surrounded by the color markers are most likely reproduced in their original form.

With respect to the marker editing function described above, the specification of the area to be processed is specified by drawing a closed loop on the original sheet. This same procedure applies also to the specification of the area for processing in each of the editing functions mentioned below. Additionally, the area specified by the color marker can be displayed in an analogous figure in a bit map area on the cathode ray tube.

In a black and red mode, the image inside the marker area is changed to red while the areas other than the area surrounded by the marker are rendered in black and red on the copy. This function is accompanied with trimming, masking, color mesh, and black to color functions.

The trimming function works to copy only the image within the marked area and to erase the image position outside the marked area. The mask1 ng function works to erase the image within the marked area and to copy only the image position outside the marked area.

The color mesh function places a specified color mesh pattern in the marked area and reproduces the image therein. The color of the color mesh can be selected from eight standard colors (the specified colors being determined in advance), eight registered colors (colors being preregistered by the user, a maximum of eight colors can be registered at the same time out of 16,700,000 available colors), or by the actual color of the marker. A mesh pattern can be selected out of four available patterns.

The black to color function permits the reproduction of the image within the marked area on the copy to be reproduced in any specified color selected from eight standard colors, eight preregistered colors, or the color of the actual marker.

Furthermore, it is possible also to use any combination of the basic copying functions, the additional functions, and the marker editing function to process the document in the desired fashion.

Figure 15A:
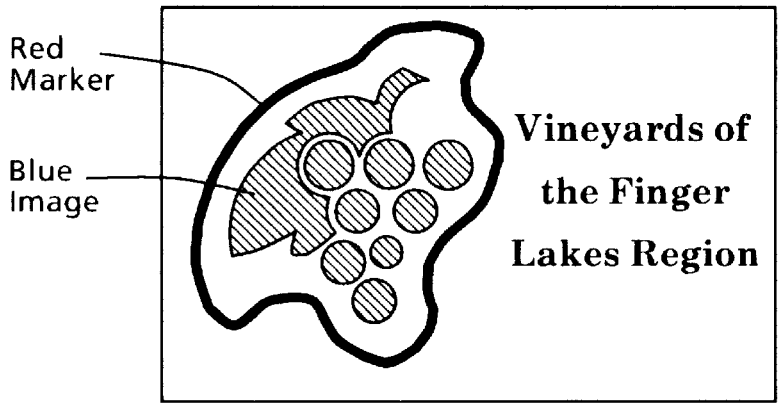
FIGS. 15(A)–15(D) illustrate an example showing the steps of marker detection in color editing.
Figure 15B:
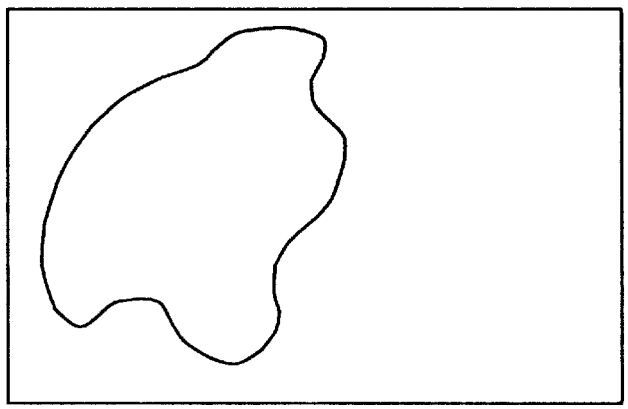
Figure 15C:
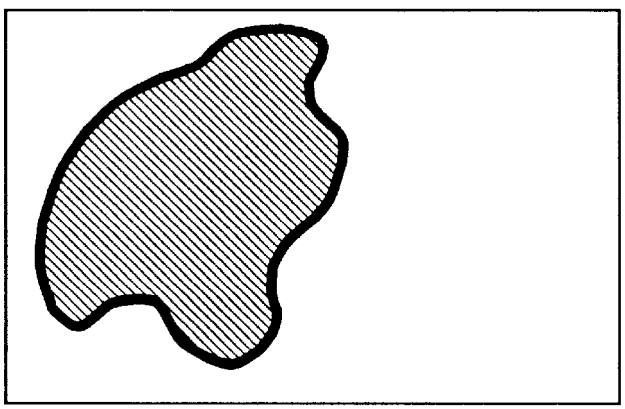
Figure 15D:
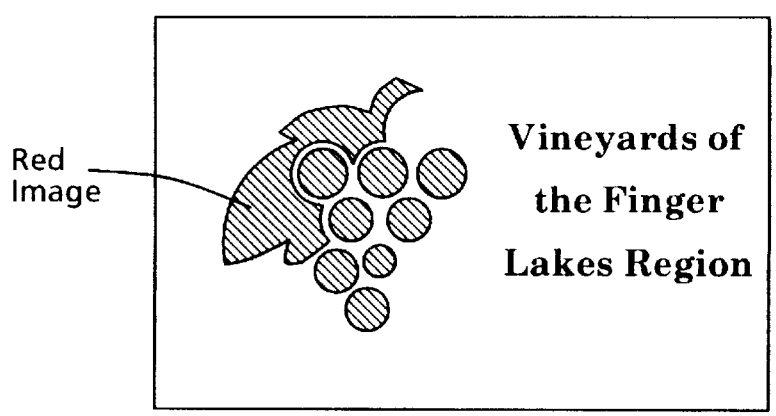

FIGS. 15(A)–15(D) illustrate an example of a typical color conversion process utilizing the marker editing of the present invention. More specifically, FIG. 15(A) illustrates an image that is colored blue and surrounded by a red marker. During the scanning of the image illustrated in FIG. 15(A), the present invention carries out the marking editing technique discussed above. FIG. 15(B) illustrates what the image would look like if only the data in the BUF array were printed. More specifically, FIG. 15(B) illustrates the thinned marker line surrounding the original blue image. On the other hand, FIG. 15(C) illustrates what the output of array XSTART would look like after the determination of which pixels are within the thinned marker area. Lastly, FIG. 15(D) illustrates the image which is outputted from the process wherein the original blue image is converted to a red image.

Figure 16A:
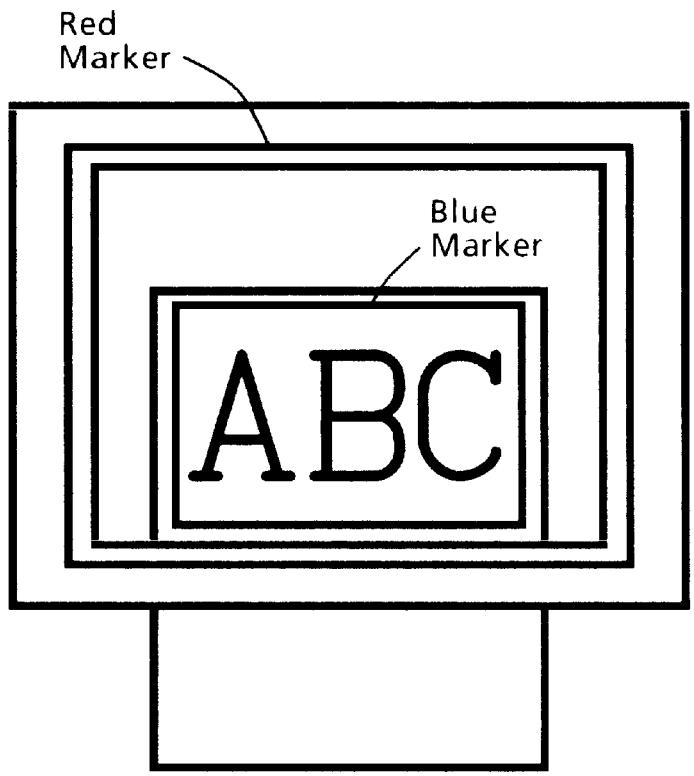
FIGS. 16(A) and 16(B) illustrate an example of marker editing with two color markers.
Figure 16B:
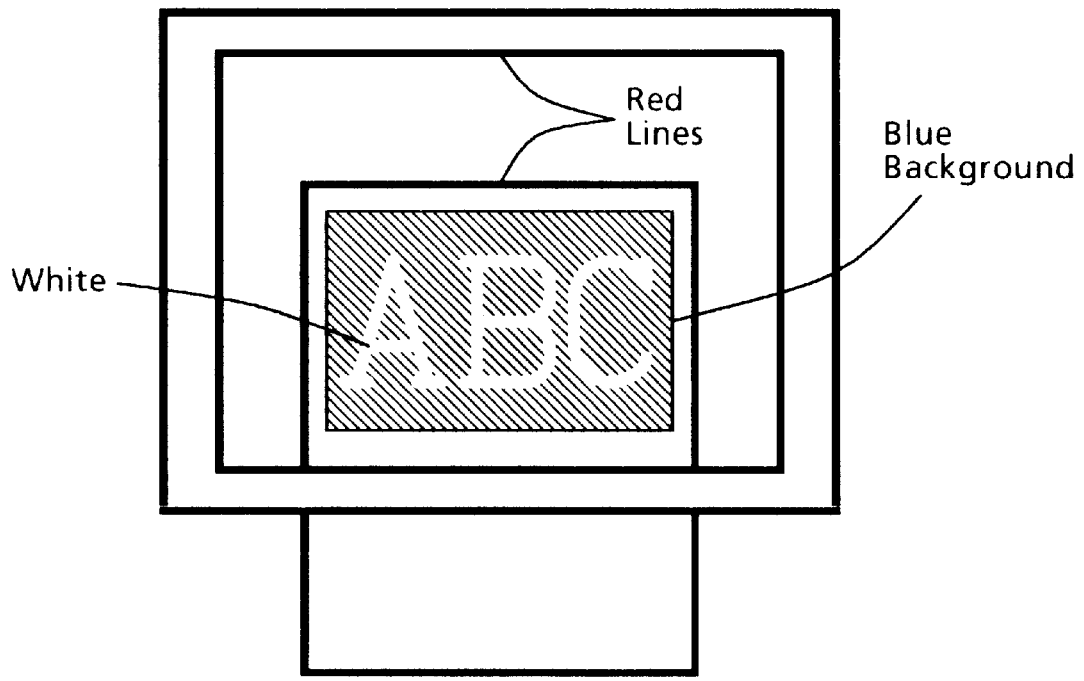

FIGS. 16(A) and 16(B) illustrate an example of processing two color markers with one color marker inside the other color marker. In this example, one color marker is red and the other color marker is blue. FIG. 16(A) illustrates the marker edited original, and FIG. 16(B) illustrates the outputted image. In this example, the white pixels inside the blue marker are changed to blue and the black pixels are changed to white. Moreover, the black pixels inside the red marker but outside the blue marker are changed to red. Thus, the word ABC is converted from a black type on a white background to a white type on a blue background and the black lines surrounding the word ABC are changed to red lines.

Figure 17A:
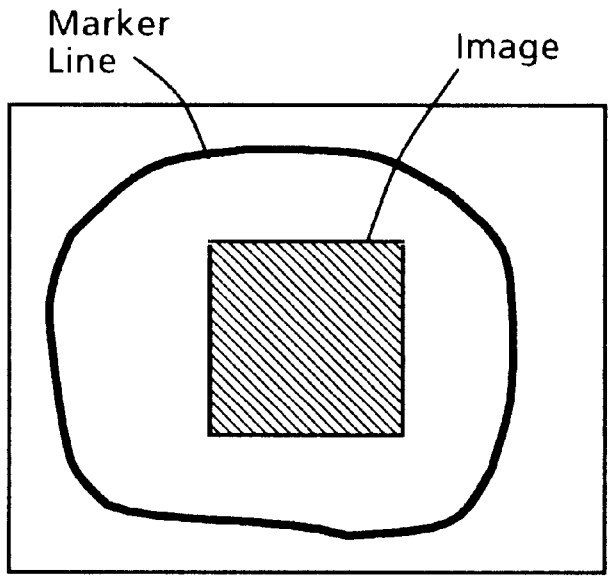
FIGS. 17(A) and 17(B) illustrate an example of marker editing with image replacement.
Figure 17B:
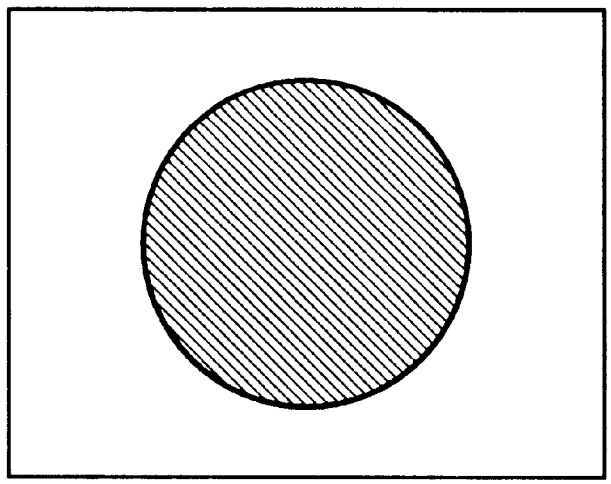

FIGS. 17(A), 17(B), 18(A), 18(B), 19(A), 19(B), 20 and 21 illustrate various examples of image processing which can be easily carried out using the marking editing procedures of the present invention. For example, FIGS. 17(A) and 17(B) illustrate how the marker editing procedure of the present invention can be utilized to remove the image within the marker line and replace the image with a new image. In this example, the image of a box has been replaced with the image of a ball.

Figure 18A:
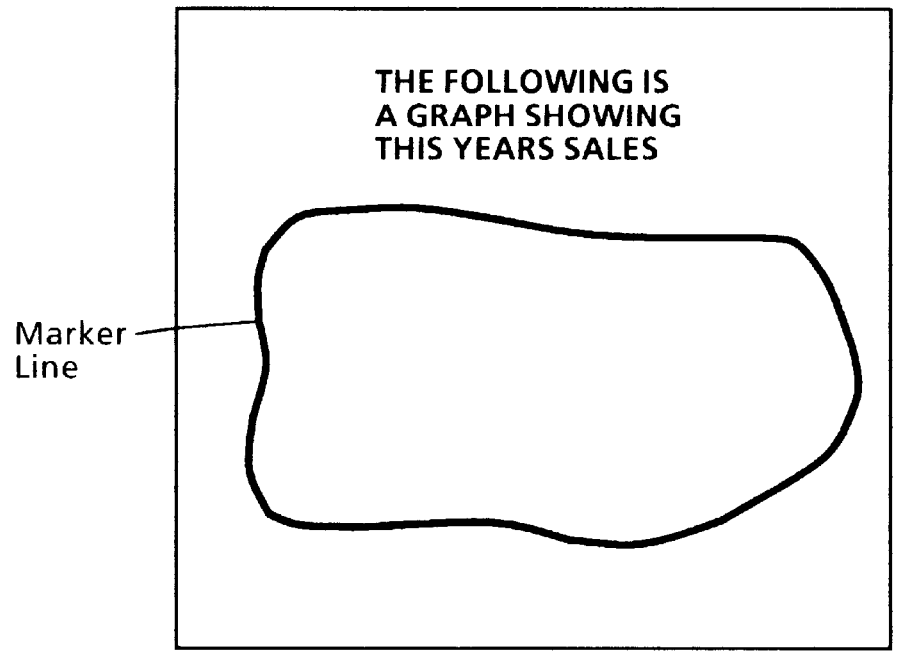
FIGS. 18(A) and 18(B) illustrate marker editing with image insertion.
Figure 18B:
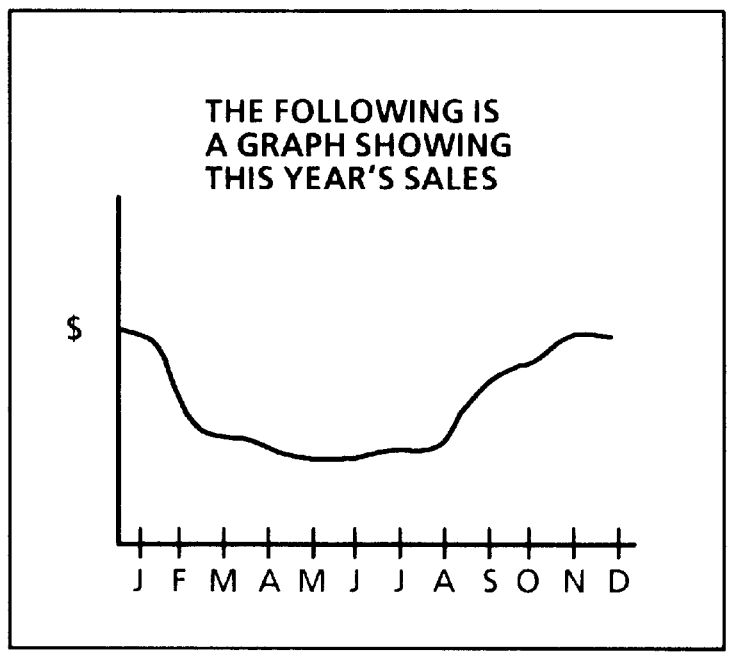
Figure 19A:
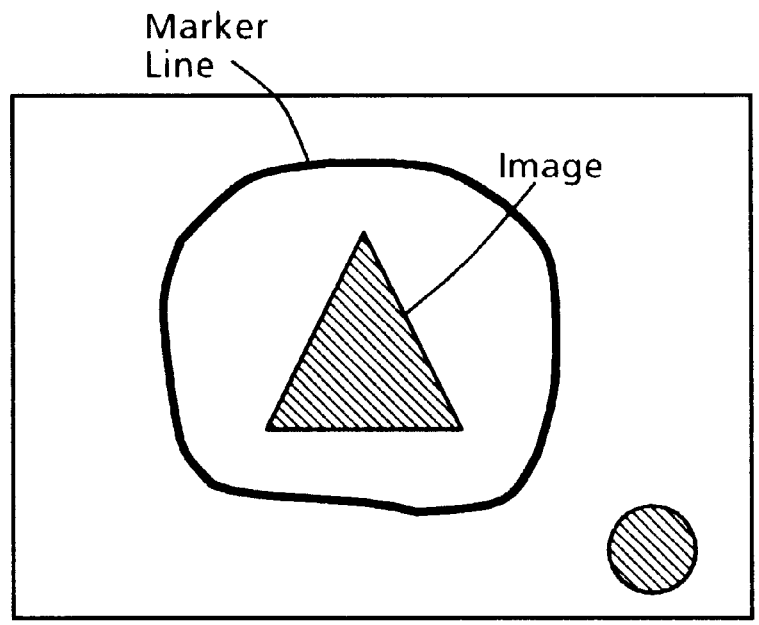
FIGS. 19(A) and 19(B) illustrate an example of marker editing with image deletion.
Figure 19B:
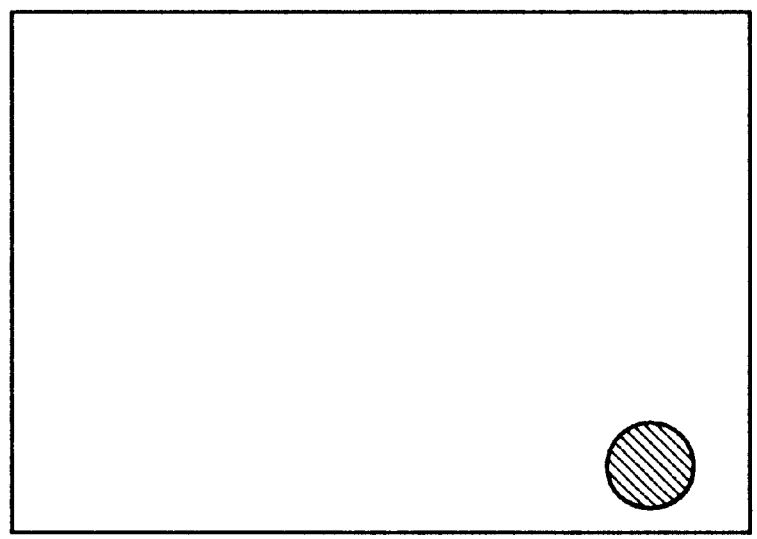

FIGS. 18(A) and 18(B) illustrate how the marker editing procedure of the present invention can be utilized to insert image data, such as graphical representations or text data into the area outlined by the marker line. In this example, graphical data was inserted into the area enclosed by the marker line. With respect to FIGS. 19(A) and 19(B), the marker editing process of the present invention is used to delete image data from inside the marker line.

Figure 20:
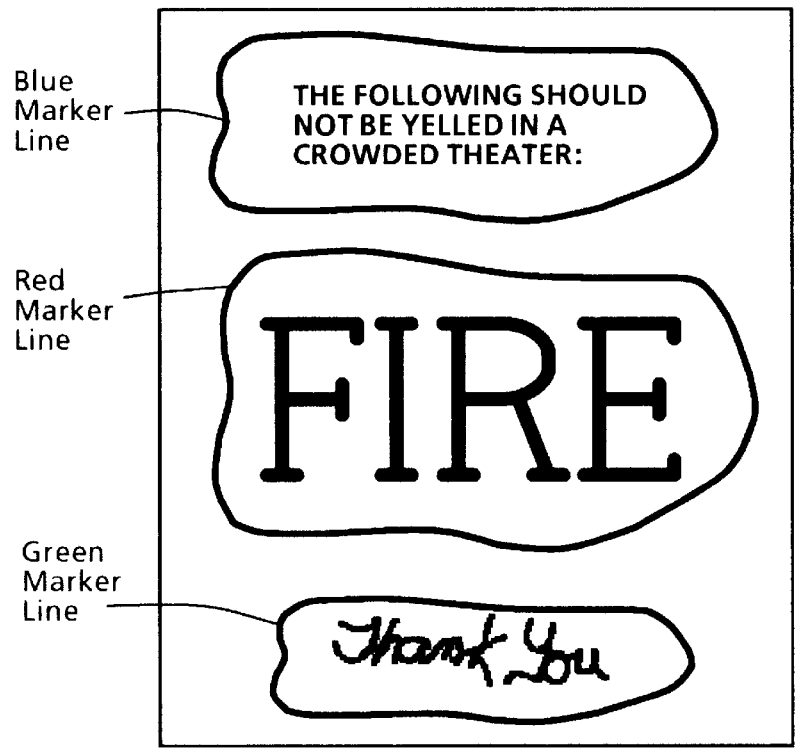
FIG. 20 illustrates an example of marker editing utilized with a character recognition process.

The marker editing procedure of the present invention can also be utilized in assisting character recognition processes. More specifically, when analyzing a text that has characters of a different sizes or styles, a different color marker line can be used to enclose the different types of text such that the image recognition process can be modified or adjusted to easily handle the text being analyzed. For example, FIG. 20 illustrates that the blue marker line encloses text having a certain size such that the image recognition process can adapt its algorithm to correspond to that particular size. Moreover, FIG. 20 illustrates that a red marker line is used to enclose a text having a larger size than the text within the blue marker line such that when the image processing encounters this text, the image recognition algorithm can be readily adapted to correspond to this larger text. Lastly, FIG. 20 illustrates the utilization of a green marker line to enclose text of a script or cursive nature. Again, the image processing device can utilize the marker editing process of the present invention to inform the image recognition process that the text now being received will be of a cursive or script nature and thus making the image recognition process more efficient.

Figure 21:
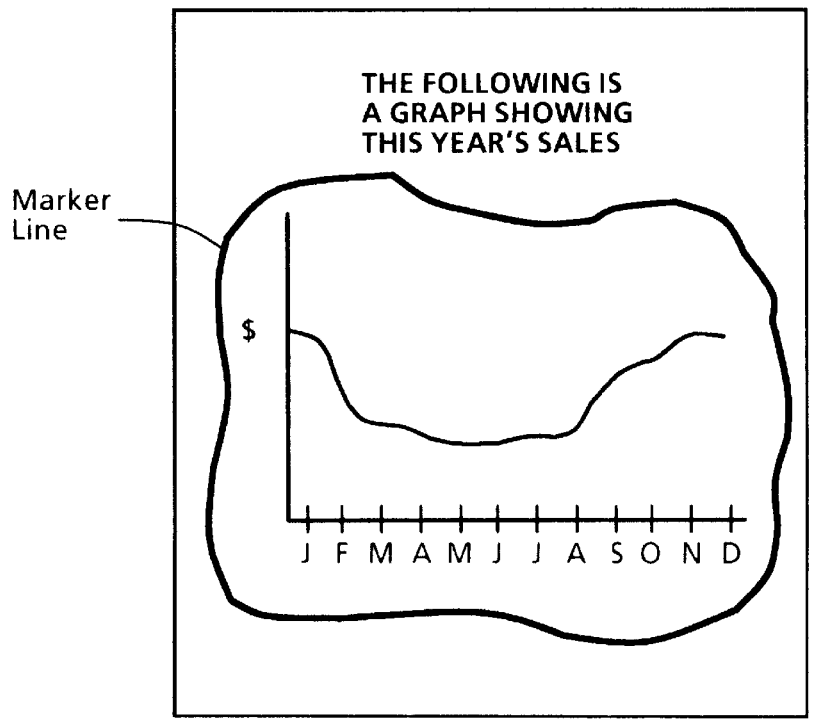
FIG. 21 illustrates a further example of marker editing utilized with a character recognition process.

FIG. 21 illustrates the use of a marker line in an image recognition process which would inform the image recognition process to ignore all data within the marking line because such data is graphical data and need not be analyzed for character recognition. Thus, the character recognition process can be carried out more effectively.

Figure 22:
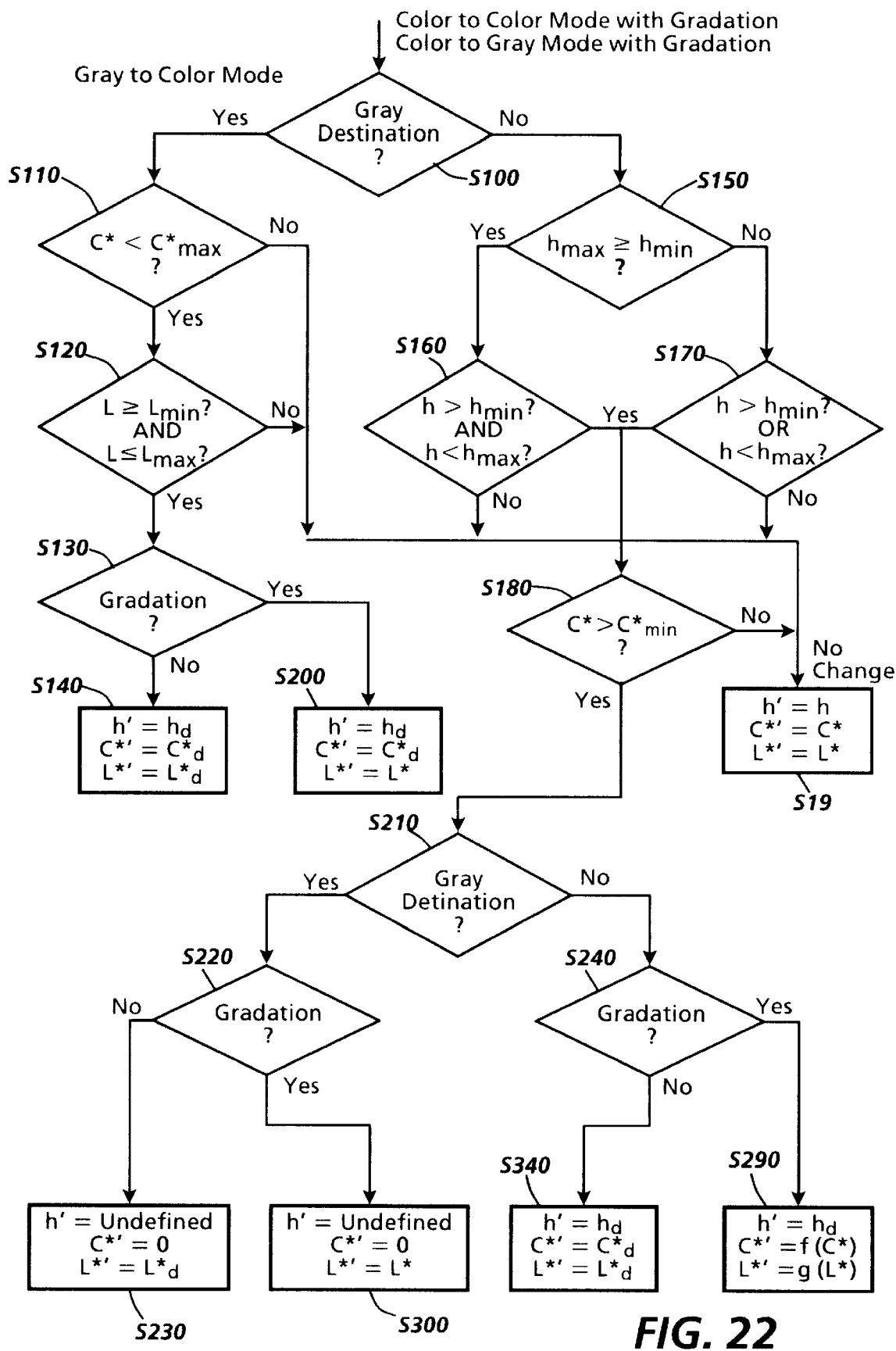
FIG. 22 illustrates a flowchart showing a color conversion process for the present invention.
Figure 23:
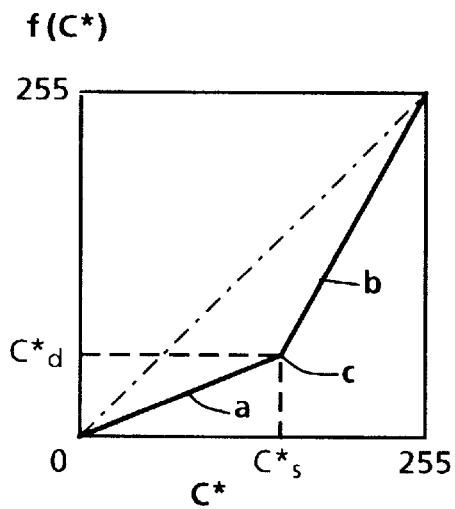
FIGS. 23, 24, 25, and 26 illustrate graphical representations of functional relationships between source chroma and lightness values and destination chroma and lightness values according to a preferred color conversion process for the present invention.
Figure 24:
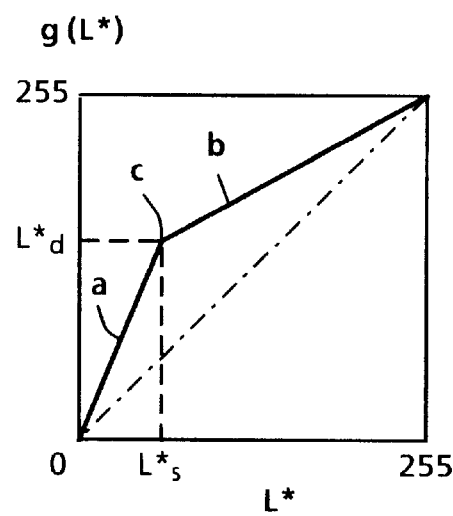
Figure 25:
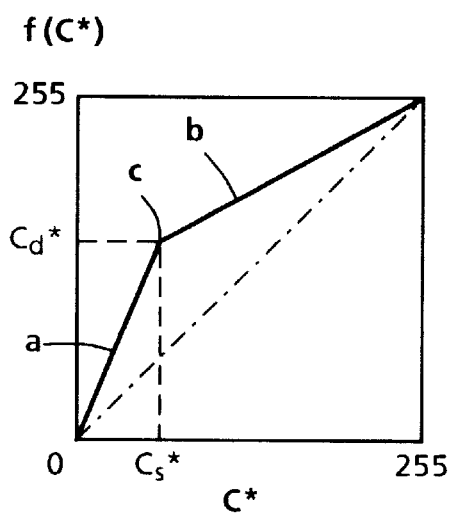
Figure 26:
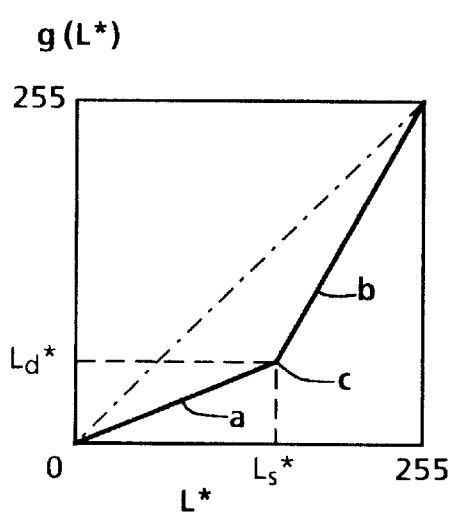

An example of a color to color conversion process that can be implemented with the present invention is illustrated in FIG. 22. The process of FIG. 22 is carried out upon the pixel data within the thinned marker. First, it is determined at step s100 whether the incoming pixel value is a gray source. If the pixel value in question is a gray source, step s110 determines whether the pixel value has a chroma value less than the maximum chroma value($C^*_{max}$). If the chroma value of the pixel in question is not less than $C^*_{max}$, step s190 establishes the hue, chroma, and lightness values to remain unchanged in the pixel in question.

However, if step s110 determines that the chroma value of the pixel in question is less than $C^*_{max}$, step s120 determines whether the lightness value of the pixel in questions is greater than a minimum lightness value ($L^*_{min}$) and less than a maximum lightness value ($L^*_{max}$). If this condition is not satisfied at step s120, the hue, chroma, and lightness values are established as described above with respect to step s190.

If the lightness value of the pixel in question does satisfy the conditions of step s120, step s130 determines whether a gradation mode has been selected. If a gradation mode has been selected, step s200 establishes the hue and chroma values to be the destination hue and chroma values while allowing the lightness value to remain unchanged. On the other hand, if step s130 determines that no gradation mode has been selected, step s140 establishes the hue, chroma, and lightness values to be the destination hue, chroma, and lightness values, respectively.

On the other hand, if step s100 determines that the source is not a gray source, step s150 determines whether the maximum hue value ($h_{max}$) of the hue window is greater than or equal to the minimum hue value ($h_{min}$) for the hue window. If $h_{max}$ is greater than $h_{min}$, step s160 determines whether the hue value of the pixel in question is greater than $h_{min}$ of the hue window and less than $h_{max}$ of the hue window.

If step s150 determines that $h_{max}$ for the hue window is not greater than $h_{min}$ for the hue window, step s170 determines whether the hue value for the pixel in question is greater than $h_{min}$ for the hue window or less than $h_{max}$ for the hue window. If the hue value of the pixel in question does not meet the condition of step s160 or the condition of step s170, the hue, chroma, and lightness values are established as discussed above with respect to step s190.

However, if the hue value of the pixel in question meets the conditions of either step s160 or step s170, step s180 determines whether the chroma value of the pixel in question is greater than a minimum chroma value ($C^*_{min}$). If step s180 determines that the chroma value of the pixel in question is not greater than $C^*_{min}$, the hue, chroma, and lightness values remain unchanged as discussed above with respect to step s190. On the other hand, if the chroma value of the pixel in question is greater than $C^*_{min}$, step s210 determines whether the destination color is a gray destination.

If the destination color is a gray destination, step s220 determines whether a gradation mode has been selected. If a gradation mode has been selected, step s300 establishes the hue value as being undefined, the chroma value as being equal to zero, and allows the lightness value to remain unchanged. However, if step s220 determines that no gradation has been selected, step s230 establishes the hue value as being undefined, the chroma value as zero, and the lightness value as being equal to the destination lightness value.

On the other hand, if step s210 determines that the destination color is not a gray destination, step s240 determines whether a gradation mode has been selected. If no gradation mode has been selected, step s340 establishes the hue value as the destination hue value, the chroma value as the destination chroma value, and the lightness value as the destination lightness value. However, if a gradation has been selected in step s240, step s390 establishes the hue value as the destination hue value, the chroma value as the destination chroma value, and the lightness value as the destination lightness value according to a predetermined functional relationship.

The functional relationship between the chroma value of the pixel in question and the chroma value for the destination color can be realized in many ways. Also, the functional relationship between the lightness value of the pixel in question and the lightness value for the destination color can be realized in many ways.

The functional relationship between the chroma and lightness values of the pixel in question and the destination chroma and lightness values may be mapped through the chroma and lightness values of the selected source color and the chroma and lightness values of the selected destination color. Such a mapping technique is represented by a "rubber band" transformation as illustrated in FIGS. 23, 24, 25, and 26.

With respect to the "rubber band" transformation, the actual chroma and lightness values for the selected source color and the chroma and lightness values of the designated color are an integral part of the mapping function. In this embodiment, the actual chroma and lightness values for the selected source color are, initially, mapped directly to the chroma and lightness values of the designated color (point c).

Using the mapping of the chroma values as an example, the mapping function of the "rubber band" transformation will be explained. The remaining chroma values, the chroma values other than the chroma values for the selected source and destination color, are mapped utilizing a first straight line (line a) connecting the point representing pure gray to the exact mapped point (c) and a second straight line (line b) connecting the exact mapped point (c) to the point representing a pure hue. In other words, the chroma values which are less than the chroma value of the selected source color (point c) are mapped according to a first function (line a), and the chroma values greater than the chroma value of the selected source color (point c) are mapped utilizing a second function (line b). In this way, the chroma values of the selected source and destination colors are integrated into the mapping function such that the actual mapping function is dependent upon these values. This mapping function is also equally applicable to the mapping of the lightness values.

This transformation takes on the characteristics of a rubber band being originally extended between two points (in case of the chroma mapping, the two points are gray and pure hue) and which has been stretched to a third point (point (c), the point established by the chroma values of the selected source and destination colors) outside the original path of extension (the dotted line). By using this type of transformation to map the chroma and lightness values, the negative effects of different average chroma and lightness values for the source and destination colors in a color to color conversion process can be significantly reduced or effectively overcome.

FIGS. 23, 24, 25, and 26 represent only two possibilities for implementing the "rubber band" transformation. More specifically, the apex (point c) of each transformation (function) could be below or above the dotted line. Also, the chroma and lightness values could be mapped using a nonlinear function. Moreover, the type of mapping for the individual values is interchangeable.

Although the present invention has been described in detail above, various modifications can be implemented without imparting from the spirit. For example, the mapping functions, although only described in detail with respect to a few embodiments, may incorporate any type of function wherein the selected source chroma and lightness values and the selected destination chroma and lightness values are made an integral part of the functions; i.e., the functions are dependent upon these values. Moreover, the mapping can more sophisticated by having more than one selected source chroma value, selected source lightness value, selected destination chroma value, and selected destination lightness value.

For example, the user may select two source colors of the same hue, thus, producing two selected source chroma values. In this example, the "rubber band" transformation would consist of three lines with respect to the mapping function. Therefore, the present invention is not limited to the selection of only one source color and one destination color having a same hue.

Moreover, the present invention has been described in utilization with respect to digital copiers. However, the present invention can be utilized in any device which utilizes a marker editing system. More specifically, the marker editing system as described above could be utilized with respect to a display device and a light pen wherein the light pen could be used to markup an image on the display device with various color marker lines. Moreover, the present invention can be utilized in any marker editing system which requires a fast and efficient way of determining the enclosed marker area.

While the invention has been described with reference to the various embodiments disclosed above, it is not confined to the details set forth above, but is intended to cover such modifications or changes as may come within the scope of the attached claims.

What is claimed is:

1. A color copier for processing marker data during a single pass scanning of a document, comprising:

scanning means for scanning the document using a single pass scanning operation and for generating image and marker data therefrom, the marker data representing a marker line;

marker data buffer means for buffering the marker data;

first analyzing means, operatively connected to said marker data buffer means, for analyzing, during the single pass scanning operation of said scanning means, the buffered marker data associated with pixels adjacent to a first pixel, the first pixel being a pixel in a first scanline, the first scanline having been scanned prior in time to a second scanline, said second scanline being presently scanned in the single pass scanning operation by said scanning means;

determining means, responsive to said first analyzing means, for determining a connectivity relationship of a marker line, the connectivity relationship being between the first pixel and pixels adjacent to the first pixel; and thinning means for eliminating, during the single pass scanning operation of said scanning means, marker data in said marker data buffer means associated with the first pixel when said first analyzing means determines that elimination of the marker data associated with the first pixel is not required to maintain connectivity of the marker line.

2. The color copier as claimed in claim 1, wherein said thinning means, during the single pass scanning operation of said scanning means, maintains the marker data associated with the first pixel when said first analyzing means determines that maintaining of the marker data associated with the first pixel is required to maintain connectivity of the marker line.

3. The color copier as claimed in claim 2, wherein said first analyzing means includes a memory which has pre-stored therein a look-up table representing possible relationships between the first pixel and pixels adjacent thereto, the look-up table having data associated with each possible relationship indicating connectivity or disconnectivity.

4. The color copier as claimed in claim 3, further comprising:

second analyzing means for analyzing marker data at a second pixel, the second pixel being a pixel in a third scanline, the third scanline being scanned prior in time to the first scanline, to determine if the marker data associated with the second pixel represents a crossover of the marker line; and flag means for establishing a marker/crossover flag value when said second analyzing means determines that the marker data of the second pixel represents a crossover of the marker line.

5. The color copier as claimed in claim 4, further comprising:

third analyzing means for analyzing, when said marker/crossover flag value is set, the image data associated with a third pixel when said marker/crossover flag value is set, the third pixel being scanned subsequent in time to said second pixel and in the third scanline and for determining if the image data associated with the third pixel represents a color equivalent to a predetermined source color;

color converting means for converting the image data of the third pixel to image data representing a destination color when said third analyzing means determines that the image data of the third pixel represents a color equivalent to the predetermined source color;

printer means for producing a colored hardcopy of the scanned document with at least one original color being printed as a destination color according to said color converting means.

6. A method for analyzing, during a single pass scanning process, pixel image data stored in a memory to detect marker data of a predetermined color and to thin the marker data, comprising the steps of:

(a) buffering, during the single pass scanning process, marker data, marker data representing a marker line, in a buffer;

(b) analyzing, during the single pass scanning process, buffered marker data associated with a first pixel, the first pixel being a pixel in a first scanline, the first scanline having been scanned prior in time to a scanline being presently scanned in the single pass scanning process, to determine if the data associated with the first pixel is marker data;

(c) analyzing, during the single pass scanning process, marker data associated with pixels adjacent to the first pixel stored in the buffer in response to said step (b) determining that the buffered marker data associated with the first pixel represents the marker line; and (d) eliminating, during the single pass scanning process, the buffered marker data associated with the first pixel in response to said step (c) determining that the elimination of the buffered marker data associated with the first pixel would maintain connectivity of the marker line.

7. The method as claimed in claim 6, further comprising the step of:

(e) maintaining, during the single pass scanning process, the buffered marker data associated with the first pixel when said step (c) determines that the elimination of the buffered marker data associated with the first pixel would cause disconnectivity of the marker line.

8. The method as claimed in claim 7, further comprising the steps of:

(f) storing image data in the memory during the single pass scanning process.

9. The method as claimed in claim 8, further comprising the steps of:

(g) analyzing marker data in the buffer associated with a second pixel, the second pixel being a pixel in a second scanline, the second scanline having been scanned prior in time to the first scanline, to determine if the marker data associated with the second pixel represents a crossover of the marker line;

(h) establishing a marker/crossover flag value representing a crossover of the marker line when said step (g) determines that the marker data associated with the second pixel represents a crossover of the marker line.

10. The method as claimed in claim 9, further comprising the steps of:

(i) analyzing the image data stored in the memory associated with a third pixel, the third pixel having been scanned subsequent in time to the second pixel and being in the second scanline, when the marker/crossover flag value is set, to determine if the image data associated with the third pixel represents a color equivalent to a predetermined source color; and (j) converting the image data of the third pixel to image data representing a destination color when said step (i) determines that the image data of the third pixel represents a color equivalent to a predetermined source color.

11. The method as claimed in claim 10, further comprising the steps of:

(k) selecting a target source color and a corresponding target destination color; and (l) converting, electronically, the selected target source color into first, second, and third target source values representing a three-dimensional color space, the first target source value representing a source hue value, and converting, electronically, the selected target destination color into first, second, and third target destination values representing a same three-dimensional color space, the first target destination value representing a destination hue value;

said step (i) including the substep of,
(i1) determining if the first color value corresponds to the first target source value;

said step (j) including the substeps of,
(j1) receiving image data associated with the fourth pixel from the memory and converting, electronically, the image data into first, second, and third color values representing the same three-dimensional color space, the first color value representing a hue value, (j2) generating a second destination value using a first function when the second color value is in a range from the second source target value to a predetermined minimum second source value, (j3) generating a second destination value using a second function when the second color value is in a range from the second source target value to a predetermined maximum second source value, (j4) generating a third destination value using a third function when the third color value is in a range from the third target source value to a predetermined minimum third source value, (j5) generating the third destination value using a fourth function when the third color value is in a range from the third target source value to a predetermined maximum third source value, and (j6) generating output color data representing the destination color based on the first destination target value and the generated second and third destination values for the fourth pixel when said substep (i1) determines that the first color value corresponds to the first target source value.

12. The method as claimed in claim 11, wherein the first function is a first straight line from the predetermined minimum second source value to the second target source value, the second function is a second straight line from the predetermined maximum second source value to the second target source value, the third function is a third straight line from the predetermined minimum third source value to the third target source value, and the fourth function is a fourth straight line from the predetermined maximum third source value to the third target source value.

13. The method as claimed in claim 9, further comprising the step of:

(i) erasing the image data associated with the third pixel in the memory when the marker/crossover flag value is set.

14. The method as claimed in claim 9, further comprising the step of:

(i) inserting new image data associated with the third pixel in the memory when the marker/crossover flag value is set.

15. The method as claimed in claim 9, further comprising the steps of:

(i) storing a value representing the color of the marker data on a stack memory when said step (e) maintains the marker data associated with the first pixel; and (i) tracking a positional relationship between two or more marker lines using the color values stored on the stack memory.

16. The method as claimed in claim 10, further comprising the step of:

(k) printing a colored hardcopy of the scanned document with at least one original color being printed as a destination color according to the color conversion of said step (i).

17. A copier for analyzing, during a single pass scanning process, pixel image data to detect a marker data of a predetermined color and to thin the marker data, comprising:

first analyzing means for analyzing, during the single pass scanning operation, image data corresponding to a first pixel, the first pixel being on a first scanline, the first scanline being presently scanned in the single pass scanning process, to determine if the image data associated with the first pixel represents a color that is equivalent to the predetermined color;

marker data means for generating marker data when it is determined by said first analyzing means that the first pixel represents a color that is equivalent to the predetermined color;

buffer means for buffering, during the single pass scanning operation, said marker data associated with the first pixel;

second analyzing means for analyzing, during the single pass scanning operation, the buffered marker data associated with a second pixel, the second pixel being a pixel in a second scanline, the second scanline having been scanned prior in time to the first scanline, to determine if the marker data associated with the second pixel represents a marker line;

determining means, responsive to said second analyzing means, for determining a connectivity relationship of a marker line, the connectivity relationship being between the second pixel and pixels adjacent to the second pixel; and thinning means for eliminating, during the single pass scanning operation, the marker data associated with the second pixel when said second analyzing means determines that the elimination of the marker data associated with the second pixel maintains connectivity of the marker line.

18. The copier as claimed in claim 17, wherein said thinning means, during the single pass scanning operation, maintains the marker data associated with the second pixel when said second analyzing means determines that the elimination of the marker data associated with the second pixel causes disconnectivity of the marker line.

19. The copier as claimed in claim 18, wherein said second analyzing means includes a memory which has prestored therein a look-up table representing possible relationships between the second pixel and the pixels adjacent thereto, the look-up table storing data indicating connectivity or disconnectivity for each possible relationship.

20. The copier as claimed in claim 19, further comprising:
third analyzing means for analyzing marker data stored in said buffer means at a third pixel, the third pixel being a pixel in a third scanline, the third scanline having been scanned prior in time to the second scanline, to determine if the marker data associated with the third pixel represents a crossover of the marker line represented by the marker data; and flag means for establishing a marker/crossover flag value representing a crossover of the marker line when said third analyzing means determines that the marker data associated with the third pixel represents a crossover of the marker line.

21. The copier as claimed in claim 20, further comprising:
fourth analyzing means for analyzing image data associated with a fourth pixel, the fourth pixel having been scanned subsequent in time to the third pixel and being in the third scanline, when said marker/crossover flag value is set, to determine if the image data associated with the fourth pixel represents a color equivalent to a predetermined source color; and color converting means for converting the image data of the fourth pixel to image data representing a destination color in response to said fourth analyzing means determining that the image data of the fourth pixel represents a color equivalent to a predetermined source color.

22. The copier as claimed in claim 21, further comprising:
first input means for selecting a target source color and a destination color;

first converting means for converting the inputted target source color to a source hue value, a source chroma reference value, and a source lightness reference value and for converting the inputted destination color to a destination hue value, a destination chroma reference value, and a destination lightness reference value; and said color converting means including,
converting means for converting the image data of the fourth pixel to a first hue value, a first chroma value, and a first lightness value, and
comparing means for comparing the source hue value with the first hue value;

said color converting means including,
first table means for generating a first set of source/destination chroma values representing a source/destination chroma relationship for sources values in a range from the source chroma reference value to a minimum source chroma value using a first function,
second table means for generating a second set of source/destination chroma values representing a source/destination chroma relationship for source values in a range from the source chroma reference value to a maximum source chroma value using a second function,
third table means for generating a third set of values representing a source/destination lightness relationship for values in a range from the source lightness reference value to a minimum source lightness value using a third function,
fourth table means for generating a fourth set of values representing a source/destination lightness relationship for values in a range from the source lightness reference value to a maximum source lightness value using a fourth function,
chroma memory means for storing the first and second sets of values,
lightness memory means for storing the third and fourth sets of values,
chroma data generating means for selecting a destination chroma value associated with the source chroma value that corresponds to the first chroma value based on the source/destination chroma relationship stored in said chroma memory means when said comparing means determines that the first hue value corresponds to the source hue value,
lightness data generating means for selecting a destination lightness value associated with the source lightness value that corresponds to the first lightness value based on the source/destination lightness relationship stored in said lightness memory means when said comparing means determines that the first hue value corresponds to the source hue value, and
converting means for converting the destination hue value and the selected destination chroma and lightness values into new image data, representing the destination color, for the fourth pixel;

memory means for storing the new image data for the fourth pixel.

23. The copier as claimed in claim 22, wherein said first function is a first straight line from the predetermined minimum second source value to the second target source value, said second function is a second straight line from the predetermined maximum second source value to the second target source value, said third function is a third straight line from the predetermined minimum third source value to the third target source value, and said fourth function is a fourth straight line from the predetermined maximum third source value to the third target source value.

24. The copier as claimed in claim 20, further comprising:
   erasing means for erasing the image data associated with the fourth pixel when the marker/crossover flag value is set.

25. The copier as claimed in claim 20, further comprising:
   editing means for changing the image data associated with the fourth pixel when the marker/crossover flag value is set.

26. The copier as claimed in claim 20, further comprising:
   stack means for storing a value representing the color of the marker line when said thinning means maintains the marker data associated with the second pixel; and
   tracking means for tracking a positional relationship between two or more color markers using the color values stored in said stack means.

27. The copier as claimed in claim 21, further comprising:
   printing means for printing a colored hardcopy of the scanned document with at least one original color being printed as a destination color according to said color converting means.

28. A method for scanning a document having at least one colored marker line and analyzing, during a single pass scanning process, pixel image data to detect a marker line of a predetermined color and to thin the marker line, comprising the steps of:
   (a) scanning an area on the document representing a first pixel on a first scanline;
   (b) buffering image data corresponding to the scanned first pixel in a first buffer and storing the image data;
   (c) analyzing, during the single pass scanning process, the buffered image data corresponding to the first pixel, to determine if the image data associated with the first pixel represents a color that is equivalent to the predetermined color and generating marker data when it is determined that the image data represents a color that is equivalent to the predetermined color;
   (d) buffering the marker data;
   (e) analyzing, during the single pass scanning process, buffered marker data associated with a second pixel and marker data associated with pixels adjacent to the second pixel, the second pixel being on a first scanline which has been scanned prior in time to the scanline being presently scanned in the single pass scanning process, to determine a connectivity relationship of a colored marker line, the connectivity relationship being between the second pixel and the pixels adjacent to the second pixel;
   (f) eliminating, during the single pass scanning process, the buffered marker data associated with the second pixel in response to said step (e) determining that the elimination of the buffered marker data associated with the second pixel maintains connectivity of the colored marker line; and
   (g) maintaining, during the single pass scanning process, the buffered marker data associated with the second pixel in response to said step (e) determining that the elimination of the buffered marker data associated with the second pixel causes disconnectivity of the colored marker line.

29. The method as claimed in claim 28, further comprising the steps of:
   (h) analyzing buffered marker data, associated with a third pixel, in the second buffer, the third pixel being on a second scanline which has been scanned prior in time to the first scanline, to determine if buffered marker data associated with the third pixel represents a crossover of the colored marker line;
   (i) establishing a marker/crossover flag value representing a crossover of the colored marker line in response to said step (h) determining that the buffered marker data corresponding to the third pixel represents a crossover of the colored marker line.

30. The method as claimed in claim 29, further comprising the steps of:
   (i) analyzing the buffered image data associated with a fourth pixel, the fourth pixel having been scanned subsequent in time to the third pixel and being on the second scanline, when the marker/crossover flag value is set, to determine if the buffered image data associated with the fourth pixel represents a color equivalent to a predetermined source color; and
   (k) converting the image data associated with the fourth pixel to image data representing a destination color in response to said step (j) determining that the buffered image data associated with the fourth pixel represents a color equivalent to a predetermined source color.

31. A method for thinning buffered marker data during a single pass scanning of a document, comprising the steps of:
   (a) analyzing, during the single pass scanning of the document, buffered marker data corresponding to pixels adjacent to a first pixel, the first pixel being associated with a first scanline, the first scanline having been scanned prior in time to a scanline being presently scanned in the single pass scanning of the document, to determine a connectivity relationship of a marker line, the connectivity relationship being between the first pixel and the pixels adjacent to the first pixel; and
   (b) eliminating, during the single pass scanning of the document, buffered marker data associated with the first pixel when said step (a) determines that the elimination of the buffered marker data associated with the first pixel maintains connectivity of the marker line.

32. The method as claimed in claim 31, further comprising the step of:
   (c) maintaining, during the single pass scanning of the document, buffered marker data associated with the first pixel when said step (a) determines that the elimination of the buffered marker data associated with the first pixel causes disconnectivity of the marker line.

33. The method as claimed in claim 32, further comprising the steps of:
   (d) analyzing, during the single pass scanning of the document, buffered marker data associated with a second pixel, the second pixel being a pixel in a second scanline, the second scanline having been scanned prior in time to the first scanline, to determine if the marker data associated with the second pixel represents a crossover of the marker line;
   (e) setting, during the single pass scanning of the document, a marker/crossover flag representing an odd-numbered crossover of the marker line in response to said step (d) determining that the buffered marker data associated with the second pixel represents an odd-numbered crossover of the marker line; and (f) resetting, during the single pass scanning of the document, the marker/crossover flag in response to said step (d) determining that the buffered marker data associated with the second pixel represents an even-numbered crossover of the marker line.

34. The method as claimed in claim 33, further comprising the steps of:

(g) buffering during a single pass scanning of the document, image data;

(h) analyzing, during a single pass scanning of the document, the buffered image data associated with a third pixel on the same scanline as the second pixel, the third having been scanned subsequent in time to the second pixel, when the marker/crossover flag is set, to determine if the buffered image data associated with the third pixel represents a color equivalent to a predetermined source color; and (i) converting, during a single pass scanning of the document, the buffered image data associated with the third pixel to image data representing a destination color in response to said step (h) determining that the buffered image data associated with the third pixel represents a color equivalent to a predetermined source color.

35. The method as claimed in claim 34, further comprising the step of:

(i) printing a colored hardcopy of the scanned document with at least one original color being printed as a destination color according to the color conversion of said step (i).

36. A copier for thinning buffered marker data during a single pass scanning of a document, comprising:

first analyzing means for analyzing, during the single pass scanning of the document, buffered marker data associated with pixels adjacent to a first pixel, the first pixel being a pixel in a first scanline, the first scanline having been scanned prior in time to a scanline being presently scanned in the single pass scanning of the document, to determine a connectivity relationship of a marker line, the connectivity relationship being between the first pixel and pixels adjacent the first pixel; and thinning means for eliminating, during the single pass scanning of the document, buffered marker data associated with the first pixel when said first analyzing means determines that elimination of the buffered marker data associated with the first pixel maintains connectivity of the marker line.

37. The copier as claimed in claim 36, wherein said thinning means, during the single pass scanning of the document, maintains the buffered marker data associated with the first pixel when said first analyzing means determines that elimination of the buffered marker data associated with the first pixel causes disconnectivity of the marker line.

38. The copier as claimed in claim 37, wherein said first analyzing means includes a memory which has prestored therein a look-up table representing possible relationships between the first pixel and pixel adjacent therewith, the look-up table storing data indicating connectivity or disconnectivity for each possible relationship.

39. The copier as claimed in claim 37, further comprising:

second analyzing means for analyzing buffered marker data associated with a second pixel, the second pixel being a pixel in a second scanline, the second scanline having been scanned prior in time to the first scanline, to determine if the buffered marker data associated with the second pixel represents a crossover of the marker line; and flag means for setting a marker/crossover flag representing an odd-numbered crossover of the marker line in response to said second analyzing means determining that the buffered marker data associated with the second pixel represents an odd-numbered crossover of the marker line;

said flag means resetting the marker/crossover flag in response to said second analyzing means determining that the buffered marker data associated with the second pixel represents an even-numbered crossover of the marker line.

40. The copier as claimed in claim 39, further comprising:

buffer means for buffering image data during the single pass scanning of the document;

third analyzing means for analyzing the buffered image data associated with a third pixel on the same scanline as the second pixel, the third pixel having been scanned subsequent in time to the second pixel, when said marker/crossover flag is set, to determine if the buffered image data associated with the third pixel represents a color equivalent to a predetermined source color;

color converting means for converting the buffered image data of the third pixel to image data representing a destination color in response to said third analyzing means determining that the buffered image data of the third pixel represents a color equivalent to a predetermined source color; and printer means for producing a colored hardcopy of the scanned document with at least one original color being printed as a destination color according to said color converting means.

* * * * *